(12) United States Patent
Lou et al.

(10) Patent No.: US 11,502,785 B2
(45) Date of Patent: Nov. 15, 2022

(54) COMMUNICATION METHOD, ACCESS NETWORK DEVICE, AND TERMINAL

(71) Applicant: HUAWEI TECHNOLOGIES CO., LTD., Guangdong (CN)

(72) Inventors: Chong Lou, Shanghai (CN); Xing Liu, Shenzhen (CN); Qufang Huang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 95 days.

(21) Appl. No.: 16/787,308

(22) Filed: Feb. 11, 2020

(65) Prior Publication Data
US 2020/0177315 A1 Jun. 4, 2020

Related U.S. Application Data

(63) Continuation of application No. PCT/CN2018/099630, filed on Aug. 9, 2018.

(30) Foreign Application Priority Data

Aug. 11, 2017 (CN) .......................... 201710684034.0

(51) Int. Cl.
*H04L 1/18* (2006.01)
*H04L 47/283* (2022.01)
(Continued)

(52) U.S. Cl.
CPC .......... *H04L 1/1812* (2013.01); *H04L 1/1848* (2013.01); *H04L 47/283* (2013.01);
(Continued)

(58) Field of Classification Search
CPC ... H04L 1/1812; H04L 1/1848; H04L 47/283; H04W 72/02; H04W 72/042; H04W 72/0446; H04W 72/1268; H04W 72/14
See application file for complete search history.

(56) References Cited

U.S. PATENT DOCUMENTS

| | | | |
|---|---|---|---|
| 2009/0046650 A1* | 2/2009 | Dalsgaard | ............. H04L 1/1819 370/329 |
| 2011/0029833 A1 | 2/2011 | Zhang et al. | |

(Continued)

FOREIGN PATENT DOCUMENTS

| | | |
|---|---|---|
| CN | 102342061 A | 2/2012 |
| CN | 106464453 A | 2/2017 |

(Continued)

OTHER PUBLICATIONS

3GPP TSG RAN WG1 NR Ad-Hoc#2:, "RAN1 Chairman's Notes," Qingdao, P.R. China, Jun. 27-30, 2017, 55 pages.
(Continued)

*Primary Examiner* — Peter Chen
(74) *Attorney, Agent, or Firm* — Fish & Richardson P.C.

(57) ABSTRACT

An access network device sends first information and second information to a terminal, where the first information includes a value set of a communication time interval, and the second information indicates a value of the communication time interval in the value set, and the value is used to determine timing duration of a hybrid automatic repeat request (HARQ) round trip time (RTT) timer. The communication time interval includes at least one of a time interval from the terminal receiving downlink scheduling grant information to the terminal receiving downlink data scheduled by using the downlink scheduling grant information, a time interval from the terminal receiving downlink data to the terminal sending HARQ feedback information of the downlink data, and a time interval from the terminal receiving uplink scheduling grant information to the terminal sending uplink data scheduled by using the uplink scheduling grant information.

20 Claims, 11 Drawing Sheets

(51) Int. Cl.
*H04W 72/02* (2009.01)
*H04W 72/04* (2009.01)
*H04W 72/12* (2009.01)
*H04W 72/14* (2009.01)

(52) U.S. Cl.
CPC ......... *H04W 72/02* (2013.01); *H04W 72/042* (2013.01); *H04W 72/0446* (2013.01); *H04W 72/1268* (2013.01); *H04W 72/14* (2013.01)

(56) References Cited

U.S. PATENT DOCUMENTS

| | | | |
|---|---|---|---|
| 2011/0310830 A1* | 12/2011 | Wu | H04L 5/0032 370/329 |
| 2015/0124671 A1 | 5/2015 | Tabet et al. | |
| 2015/0312889 A1 | 10/2015 | Lee et al. | |
| 2016/0381730 A1 | 12/2016 | Jain et al. | |
| 2018/0332479 A1 | 11/2018 | Chai et al. | |
| 2019/0052416 A1* | 2/2019 | Babaei | H04L 1/188 |

FOREIGN PATENT DOCUMENTS

| | | |
|---|---|---|
| CN | 106992846 A | 7/2017 |
| WO | 2017134523 A1 | 8/2017 |

OTHER PUBLICATIONS

Huawei, HiSilicon, "HARQ RTT Time," 3GPP TSG-RAN WG2 #99 Meeting, R2-1707726; Berlin, Germany, Aug. 21-25, 2017, 5 pages.

InterDigital Communications, "SCI Contents for R14 V2V," 3GPP TSG-RAN WG1 Meeting #86, R1-167590; Gothenburg, Sweden, Aug. 22-26, 2016, 2 pages.

LG Electronics Inc, "Consideration on HARQ RTT Timer," 3GPP TSG-RAN2 Meeting #99-Bis, R2-1710755, Prague, Czech, Oct. 9-13, 2017, 6 pages.

LG Electronics Inc., "HARQ RTT Timer with reduced processing time," 3GPP TSG-RAN WG2 Meeting #97, R2-1701545; Athens, Greece, Feb. 13-17, 2017, 2 pages.

MCC Support, "Draft Report of 3GPP TSG RAN WG1 #89 v0.2.0 (Hangzhou, China, May 15-19, 2017)," 3GPP TSG RAN WG1 Meeting #90, R1-171xxxx; Prague, Czech Rep, Aug. 21-25, 2017, 166 pages.

MCC Support, "Final Report of 3GPP TSG RAN WG1 #86bis v1.0.0 (Lisbon, Portugal, Oct. 10-14, 2016)," 3GPP TSG RAN WG1 Meeting #87, R1-1611081; Reno, USA, Nov. 14-18, 2016, 160 pages.

MCC Support, "Final Report of 3GPP TSG RAN WG1 #87 v1.0.0 (Reno, USA Nov. 14-18, 2016)," 3GPP TSG RAN WG1 Meeting #88, R1-1701552; Athens, Greece, Feb. 13-17, 2017, 157 pages.

NTT Docomo, "CSI-RS Design for CSI Acquisition," 3GPP TSG RAN WG1 Ad-Hoc#2, R1-1711083; Qingdao, P.R. China, Jun. 27-30, 2017, 4 pages.

Office Action issued in Chinese Application No. 201710684034.0 dated Dec. 26, 2019, 15 pages (with English translation).

PCT International Search Report and Written Opinion issued in International Application No. PCT/CN2018/099630 dated Oct. 16, 2018, 18 pages (with English translation).

Vice-Chairwoman (InterDigital), "Report from NR User Plane Break-Out Session," 3GPP TSG-RAN WG2 NR Ad Hoc, R2-1707500; Quingdao, China, Jun. 27-29, 2017, 33 pages.

Extended European Search Report issued in European Application No. 18845147.0 dated Jun. 25, 2020, 8 pages.

\* cited by examiner

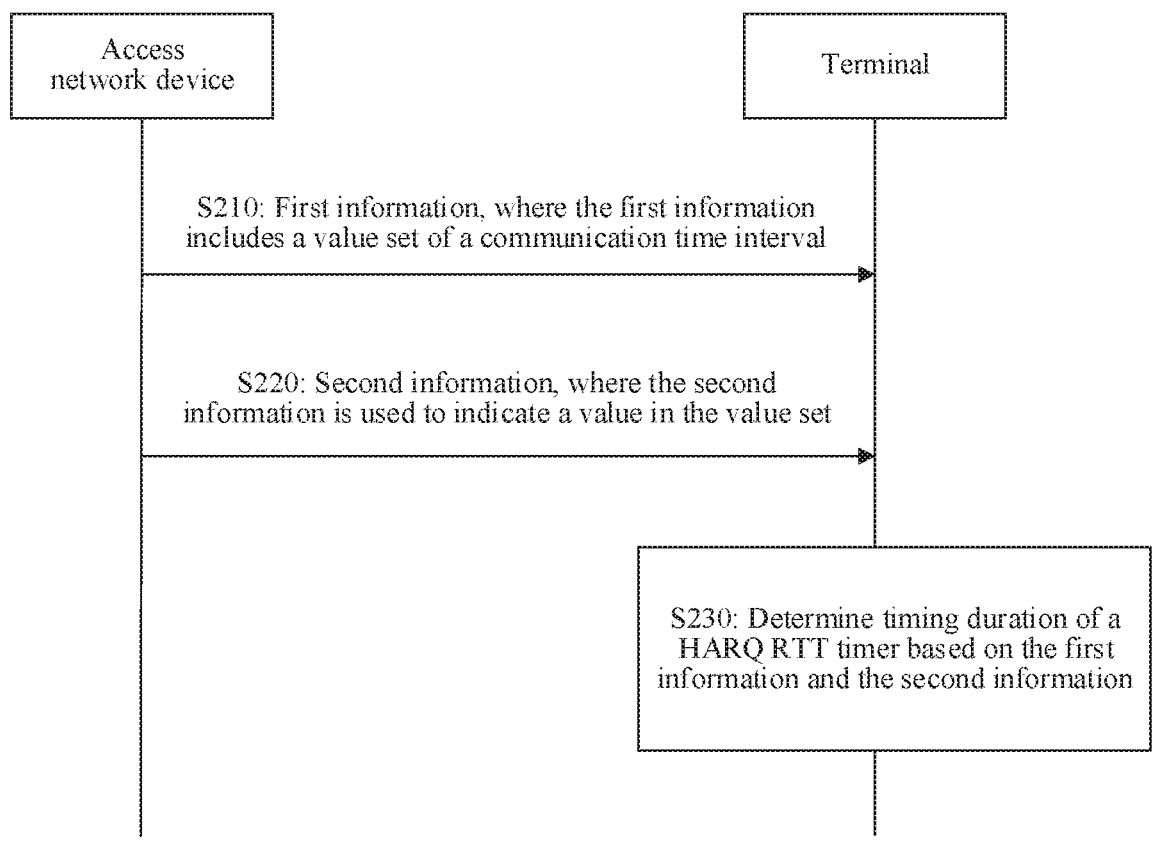

COMMUNICATION METHOD, ACCESS NETWORK DEVICE, AND TERMINAL

CROSS-REFERENCE TO RELATED APPLICATIONS

This application is a continuation of International Application No. PCT/CN2018/099630, filed on Aug. 9, 2018, which claims priority to Chinese Patent Application No. 201710684034.0, filed on Aug. 11, 2017. The disclosures of the aforementioned applications are hereby incorporated by reference in their entireties.

TECHNICAL FIELD

This application relates to the communications field, and more specifically, to a communication method, an access network device, and a terminal.

BACKGROUND

A hybrid automatic repeat request (hybrid automatic repeat request, HARQ) is a technology integrating a forward error correction (forward error correction, FEC) method and an automatic repeat request (automatic repeat request, ARQ) method.

In FEC, some errors can be corrected at a receive end by adding redundant information, to reduce a quantity of retransmissions. For an error that cannot be corrected by using the FEC, the receive end requests a transmit end to retransmit data by using an ARQ mechanism.

The receive end detects, by using an error detection code, whether an error occurs in a received data packet. If no error occurs, the receive end sends a positive acknowledgment (ACK) to the transmit end, and after receiving the ACK, the transmit end sends a next data packet. If an error occurs, the receive end sends a negative acknowledgment (NACK) to the transmit end, and after receiving the NACK, the transmit end resends same data.

For example, a base station may first feed back, to a terminal through a PHICH, HARQ information of uplink data that is previously transmitted by the terminal. The HARQ information arrives at the terminal after a specific downlink transmission latency. The terminal demodulates and processes the HARQ information on the PHICH, and sends retransmitted data at a predefined time-frequency location through a PUSCH based on the HARQ information. The retransmitted data arrives at the base station after a specific uplink transmission latency. The base station processes the retransmitted data, and after a specific processing latency, feeds back HARQ information of the retransmitted data to the terminal again through the PHICH.

For another example, the terminal may first feed back, to the base station through a PUCCH, HARQ information of downlink data that is transmitted by the base station last time. The HARQ information arrives at the base station after a specific uplink transmission latency. The base station demodulates and processes the HARQ information on the PUCCH, and schedules retransmitted data based on the HARQ information and a downlink resource allocation status. The base station sends the retransmitted data on a PDSCH based on a time-frequency location determined during downlink scheduling. The retransmitted data arrives at the terminal after a specific downlink transmission latency. The terminal processes the retransmitted data, and after a specific processing latency, feeds back HARQ information of the retransmitted data to the base station again through a PUCCH.

It is proposed in a communications system that the terminal may perform HARQ timing in a HARQ information transmission process. For example, the terminal may set a HARQ timer when sending uplink data, and receive, only after timing is completed, HARQ information sent by the base station. For another example, the terminal may set a HARQ timer after receiving downlink scheduling grant information, and send, to the base station only after timing is completed, downlink data scheduled by using the downlink scheduling grant information.

How the terminal determines timing duration of the HARQ timer is a technical problem to be resolved.

SUMMARY

This application provides a communication method, an access network device, and a terminal, to enable the terminal to determine timing duration of a HARQ timer.

According to a first aspect, this application provides a communication method. The communication method includes: sending, by an access network device, first information to a terminal, where the first information includes a value set of a communication time interval; and the communication time interval includes at least one of the following time intervals: a first time interval from the terminal receives downlink scheduling grant information sent by the access network device to the terminal receives first downlink data scheduled by using the downlink scheduling grant information, a second time interval from the terminal receives second downlink data sent by the access network device to the terminal sends HARQ feedback information of the second downlink data, and a third time interval from the terminal receives first uplink scheduling grant information sent by the access network device to the terminal sends uplink data scheduled by using the first uplink scheduling grant information; and sending, by the access network device, second information to the terminal, where the second information is used to indicate a value of the communication time interval, the value of the communication time interval belongs to the value set, and the value of the communication time interval is used to determine timing duration of a HARQ round trip time RTT timer.

In the communication method, the access network device sends the value set of the communication time interval to the terminal, and indicates a value that is in the value set and that should be used when the terminal determines the timing duration of the HARQ RTT timer, so that the terminal can determine the timing duration of the HARQ RTT timer based on the value. In this way, the terminal may perform a related operation only when the HARQ RTT timer completes timing, so that energy consumption of the terminal can be reduced. In addition, this can help the terminal more accurately communicate with the access network device.

Optionally, for a same communication time interval, there may be a plurality of different value sets on the access network device, and the different value sets correspond to different physical layer transmission formats, that is, numerologies (numerology). For example, the different value sets of the same communication time interval correspond to different subcarrier spacings (sub-carrier spacing, SCS) and/or different transmission time intervals (transmission time interval, TTI).

The access network device may configure an applicable value set for the terminal. For example, the access network device may determine a proper value set of the communication time interval for the terminal based on a transport layer transmission format currently used by the terminal.

For example, there are two value sets of the first time interval on the access network device. One is a value set 1, and the other one is a value set 2. The value set 1 corresponds to a subcarrier spacing of 15 kilohertz, and the value set 2 corresponds to a subcarrier spacing of 30 kilohertz. When a subcarrier spacing of the terminal is 30 kilohertz, the access network device may determine that a value set of the first time interval of the terminal is the value set 2. In this case, the first information includes the value set 2.

Optionally, the access network device may send a default (Default) value of the communication time interval to the terminal by using an air interface message. In this case, if the access network device does not send the second information to the terminal, the terminal may determine the timing duration of the HARQ RTT timer by using the default value of the communication time interval.

Optionally, for a same communication time interval, when there are different values sets corresponding to different physical layer transmission formats on the access network device, the access network device may send the different value sets of the same communication time interval to the terminal by using the first information. In this way, when sending the second information to the terminal, the access network device may determine a value set in the plurality of value sets based on a physical layer transmission format of the terminal, then determine a value in the value set, and send the value to the terminal by using the second information.

With reference to the first aspect, in a first possible implementation, the communication method further includes: sending, by the access network device, third information to the terminal, where the third information is used to indicate a processing time of the access network device.

Optionally, the access network device may send the third information to the terminal by using an RRC message.

The processing time of the access network device may indicate a required shortest time from the access network device receives HARQ feedback information sent by the terminal to the access network device schedules the terminal to perform downlink data retransmission or new transmission, or indicate a required shortest time from the access network device receives uplink data sent by the terminal to the access network device sends HARQ feedback information of the uplink data.

The access network device further sends the processing time of the access network device to the terminal, so that the terminal can further determine the timing duration of the HARQ RTT timer based on the processing time of the access network device in addition to the first information and the second information, and accuracy of communication between the terminal and the access network device can be further improved.

With reference to the first aspect or the first possible implementation, in a second possible implementation, before the sending, by the access network device, second information to the terminal, the communication method further includes: receiving, by the access network device, fourth information sent by the terminal, where the fourth information includes at least one of the following information: a first minimum time interval from the terminal receives third downlink data sent by the access network device to the terminal sends HARQ feedback information of the third downlink data, and a second minimum time interval from the terminal receives second uplink scheduling grant information sent by the access network device to the terminal sends uplink data scheduled by using the second uplink scheduling grant information.

When the fourth information includes the first minimum time interval, the second information may be used to indicate a value of the second time interval, and the value of the second time interval is greater than or equal to the first minimum time interval.

When the fourth information includes the second minimum time interval, the second information may be used to indicate a value of the third time interval, and the value of the third time interval is greater than or equal to the second minimum time interval.

When the fourth information includes the first minimum time interval and the second minimum time interval, the second information is used to indicate a value of the second time interval and a value of the third time interval, the value of the second time interval is greater than or equal to the first minimum time interval, and the value of the third time interval is greater than or equal to the second minimum time interval.

The first minimum time interval and the second minimum time interval each may be referred to as a processing capability of the terminal. In other words, the access network device may determine the second information based on the processing capability of the terminal that is sent by the terminal, so that a more accurate value of the communication time interval can be indicated to the terminal, and accuracy of communication between the terminal and the access network device can be further improved.

With reference to any one of the first aspect or the foregoing possible implementations, in a third possible implementation, the second information is used to indicate an index, in the value set, of the value of the communication time interval.

With reference to any one of the first aspect or the foregoing possible implementations, in a fourth possible implementation, the sending, by the access network device, second information to the terminal includes: sending, by the access network device, the second information to the terminal by using downlink control information (down-link control information, DCI) or uplink control information (up-link control information, UCI).

With reference to any one of the first aspect or the foregoing possible implementations, in a fifth possible implementation, the sending, by an access network device, first information to a terminal includes: sending, by the access network device, the first information to the terminal by using a radio resource control (radio resource control, RRC) message, a media access control (media access control, MAC) message, or a media access control MAC control element (control element, CE).

According to a second aspect, this application provides a communication method. The communication method includes: receiving, by a terminal, first information sent by an access network device, where the first information includes a value set of a communication time interval; and the communication time interval includes at least one of the following time intervals: a first time interval from the terminal receives downlink scheduling grant information sent by the access network device to the terminal receives first downlink data scheduled by using the downlink scheduling grant information, a second time interval from the terminal receives second downlink data sent by the access network device to the terminal sends HARQ feedback information of the second downlink data, and a third time interval from the terminal receives first uplink scheduling grant information sent by the access network device to the terminal sends uplink data scheduled by using the first uplink scheduling grant information; receiving, by the terminal, second information sent by the access network device, where the second information is used to indicate a value of the communication time interval, the value belongs to the value set, and the value is used to determine timing duration of a HARQ round trip time RTT timer; and determining, by the terminal, the timing duration of the HARQ RTT timer based on the first information and the second information.

In the communication method, the terminal determines the timing duration of the HARQ RTT timer based on the value of the communication time interval that is indicated by the access network device. This helps reduce energy consumption of the terminal, and in addition, helps improve accuracy of communication between the terminal and the access network device.

The HARQ RTT timer may include an uplink (uplink, UL) HARQ RTT timer and/or a downlink (downlink, DL) HARQ RTT timer.

With reference to the second aspect, in a first possible implementation, the communication method further includes: receiving, by the terminal, third information sent by the access network device, where the third information is used to indicate a processing time of the access network device; and the determining, by the terminal, the timing duration of the HARQ RTT timer based on the first information and the second information includes: determining, by the terminal, the timing duration of the HARQ RTT timer based on the first information, the second information, and the third information.

The terminal may receive, by using an RRC message, the third information sent by the access network device.

Optionally, the third information may not be received by the terminal from the access network device, but is configured on the terminal. For example, the processing time of the access network device may be configured on the terminal according to a communication protocol or a communication standard.

Optionally, the processing time of the access network device may be further used to determine a waiting time after the terminal device completes sending a random access preamble in a random access process and before the terminal device starts to receive a random access response (random access response, RAR) message sent by the access network device to the terminal device. A length of the waiting time may be equal to the processing time of the access network device, or equal to (the processing time of the access network device*M), where M may be a positive integer, a fraction, or a decimal.

Optionally, a minimum processing time of the access network device may be 0.

The processing time of the access network device may indicate a required shortest time from the access network device receives HARQ feedback information sent by the terminal to the access network device schedules the terminal to perform downlink data retransmission or new transmission, or indicate a required shortest time from the access network device receives uplink data sent by the terminal to the access network device sends HARQ feedback information of the uplink data.

In the implementation, the terminal further determines the timing duration of the HARQ RTT timer based on the processing time of the access network, and accuracy of communication between the terminal and the access network device can be further improved.

With reference to the first possible implementation, in a second possible implementation, the communication time interval includes the first time interval and the second time interval.

The determining, by the terminal, the timing duration of the HARQ RTT timer based on the first information, the second information, and the third information includes: determining, by the terminal, a value K0 indicated by the second information in a value set of the first time interval, and determining a value K1 indicated by the second information in a value set of the second time interval; and determining, by the terminal, K1+K0+Δ as timing duration of a downlink HARQ RTT timer, where Δ indicates the processing time of the access network device.

The communication method further includes: starting, by the terminal, the downlink HARQ RTT timer in a subframe in which the downlink scheduling grant information is received, or in a transmission time interval in which the downlink scheduling grant information is received, or in a slot in which the downlink scheduling grant information is received, or in the first symbol after the downlink scheduling grant information is received.

With reference to the second possible implementation, in a third possible implementation, the communication method further includes: starting, by the terminal, a retransmission timer (re-transmission tinter) in the subframe in which the downlink scheduling grant information is received, or in the transmission time interval in which the downlink scheduling grant information is received, or at a moment K1+K0+Δ after the slot in which the downlink scheduling grant information is received, or at a moment K1+K0+Δ after the first symbol after the downlink scheduling grant information is received.

With reference to the first possible implementation, in a fourth possible implementation, the communication time interval includes the second time interval. The determining, by the terminal, the timing duration of the HARQ RTT timer based on the first information, the second information, and the third information includes: determining, by the terminal, a value K1 indicated by the second information in a value set of the second time interval; and determining, by the terminal, K1+Δ as timing duration of a downlink HARQ RTT timer, where Δ indicates the processing time of the access network device.

The communication method further includes: starting, by the terminal, the downlink HARQ RTT timer in a subframe in which the second downlink data is received, or in a transmission time interval in which the second downlink data is received, or in a slot in which the second downlink data is received, or in the first symbol after the second downlink data is received.

With reference to the first possible implementation, in a fifth possible implementation, the communication time interval includes the third time interval. The determining, by the terminal, the timing duration of the HARQ RTT timer based on the first information, the second information, and the third information includes: determining, by the terminal, a value K2 indicated by the second information in a value set of the third time interval; and determining, by the terminal, K2+Δ as timing duration of an uplink HARQ RTT timer, where Δ indicates the processing time of the access network device.

The communication method further includes: starting, by the terminal, the uplink HARQ RTT timer in a subframe in which the first uplink scheduling grant information is received, or in a transmission time interval in which the first uplink scheduling grant information is received, or in a slot in which the first uplink scheduling grant information is received, or in the first symbol after the first uplink scheduling grant information is received.

With reference to the second aspect, in a sixth possible implementation, the communication time interval includes the second time interval.

The determining, by the terminal, the timing duration of the HARQ RTT timer based on the first information and the second information includes: determining, by the terminal, a value K1 indicated by the second information in a value set of the second time interval; and determining, by the terminal, K1*N as timing duration of a downlink HARQ RTT timer, where N is a predefined positive integer.

The communication method further includes: starting, by the terminal, the downlink HARQ RTT timer in a subframe in which the second downlink data is received, or in a transmission time interval in which the second downlink data is received, or in a slot in which the second downlink data is received, or in the first symbol after the second downlink data is received.

With reference to the sixth possible implementation, in a seventh possible implementation, the communication method further includes: starting, by the terminal, a retransmission timer in the subframe in which the second downlink data is received, or in the transmission time interval in which the second downlink data is received, or at a moment K1*N+Δ after the slot in which the second downlink data is received, or at a moment K1*N N+Δ after the first symbol after the second downlink data is received, where Δ indicates the processing time of the access network device, the processing time of the access network device is obtained by the terminal from the access network device or is preconfigured on the terminal, and N may be a predefined positive integer.

With reference to the second aspect, in an eighth possible implementation, the communication time interval includes the first time interval and the second time interval.

The determining, by the terminal, the timing duration of the HARQ RTT timer based on the first information and the second information includes: determining, by the terminal, a value K0 indicated by the second information in a value set of the first time interval, and determining a value K1 indicated by the second information in a value set of the second time interval; and determining, by the terminal, K1+K0 as timing duration of a downlink HARQ RTT timer.

The communication method further includes: starting, by the terminal, the downlink HARQ RTT timer in a subframe in which the downlink scheduling grant information is received, or in a transmission time interval in which the downlink scheduling grant information is received, or in a slot in which the downlink scheduling grant information is received, or in the first symbol after the downlink scheduling grant information is received.

With reference to the eighth possible implementation, in a ninth possible implementation, the communication method further includes: starting, by the terminal, a retransmission timer in the subframe in which the downlink scheduling grant information is received, or in the transmission time interval in which the downlink scheduling grant information is received, or at a moment K1+K0 after the slot in which the downlink scheduling grant information is received, or at a moment K1+K0 after the first symbol after the downlink scheduling grant information is received.

With reference to the second aspect, in a tenth possible implementation, the communication time interval includes the second time interval.

The determining, by the terminal, the timing duration of the HARQ RTT timer based on the first information and the second information includes: determining, by the terminal, a value K1 indicated by the second information in a value set of the second time interval; and determining, by the terminal, K1 as timing duration of a downlink HARQ RTT timer.

The communication method further includes: starting, by the terminal, the downlink HARQ RTT timer in a subframe in which the second downlink data is received, or in a transmission time interval in which the second downlink data is received, or in a slot in which the second downlink data is received, or in the first symbol after the second downlink data is received.

With reference to the tenth possible implementation, in an eleventh possible implementation, the communication method further includes: starting, by the terminal, a retransmission timer in the subframe in which the second downlink data is received, or in the transmission time interval in which the second downlink data is received, or at a moment K1 after the slot in which the second downlink data is received, or at a moment K1 after the first symbol after the second downlink data is received.

With reference to the second aspect, in a twelfth possible implementation, the communication time interval includes the third time interval.

The determining, by the terminal, the timing duration of the HARQ RTT timer based on the first information and the second information includes: determining, by the terminal, a value K2 indicated by the second information in a value set of the third time interval; and determining, by the terminal, K2 as timing duration of an uplink HARQ RTT timer.

The communication method further includes: starting, by the terminal, the uplink HARQ RTT timer in a subframe in which the uplink scheduling grant information is received, or in a transmission time interval in which the uplink scheduling grant information is received, or in a slot in which the uplink scheduling grant information is received, or in the first symbol after the uplink scheduling grant information is received.

With reference to the second aspect, in a thirteenth possible implementation, the communication time interval includes the third time interval.

The determining, by the terminal, the timing duration of the HARQ RTT timer based on the first information and the second information includes: determining, by the terminal, a value K2 indicated by the second information in a value set of the third time interval; and determining, by the terminal, K2*N as timing duration of an uplink HARQ RTT timer, where N is a predefined positive integer.

The communication method further includes: starting, by the terminal, the uplink HARQ RTT timer in a subframe in which the uplink scheduling grant information is received, or in a transmission time interval in which the uplink scheduling grant information is received, or in a slot in which the uplink scheduling grant information is received, or in the first symbol after the uplink scheduling grant information is received, where Δ indicates the processing time of the access network device, and the processing time of the access network device is obtained by the terminal from the access network device or is preconfigured on the terminal.

With reference to any one of the second aspect or the foregoing possible implementations, in a fourteenth possible implementation, the second information is used to indicate an index, in the value set, of the value of the communication time interval.

With reference to any one of the second aspect or the foregoing possible implementations, in a fifteenth possible implementation, the receiving, by the terminal, second information sent by the access network device includes: receiving, by the terminal by using DCI and UCI, the second information sent by the access network device.

With reference to any one of the second aspect or the foregoing possible implementations, in a sixteenth possible implementation, before the receiving, by the terminal, second information sent by the access network device, the communication method further includes: sending, by the terminal, fourth information to the access network device, where the fourth information includes at least one of the following information: a first minimum time interval from the terminal receives third downlink data sent by the access network device to the terminal sends HARQ information of the third downlink data, and a second minimum time interval from the terminal receives second uplink scheduling grant information sent by the access network device to the terminal sends uplink data scheduled by using the second uplink scheduling grant information.

When the fourth information includes the first minimum time interval, the second information may be used to indicate a value of the second time interval, and the value of the second time interval is greater than or equal to the first minimum time interval.

When the fourth information includes the second minimum time interval, the second information may be used to indicate a value of the third time interval, and the value of the third time interval is greater than or equal to the second minimum time interval.

When the fourth information includes the first minimum time interval and the second minimum time interval, the second information is used to indicate a value of the second time interval and a value of the third time interval, the value of the second time interval is greater than or equal to the first minimum time interval, and the value of the third time interval is greater than or equal to the second minimum time interval.

The first minimum time interval and the second minimum time interval each may be referred to as a processing capability of the terminal.

In the implementation, the terminal reports the processing capability of the terminal to the access network device, so that the access network device can send the second information to the terminal based on the processing capability of the terminal, to indicate the value of the communication time interval. Therefore, accuracy of communication between the terminal and the access network device can be further improved.

With reference to any one of the second aspect or the foregoing possible implementations, in a seventeenth possible implementation, the receiving, by a terminal, first information sent by an access network device includes: receiving, by the terminal by using an RRC message, a MAC message, or a MAC CE, the first information sent by the access network device.

Optionally, the terminal may receive a default value (Default) of the communication time interval that is sent by the access network device by using an air interface message. In this case, if the terminal does not receive the second information from the access network device, the terminal may determine the timing duration of the HARQ RTT timer by using the default value of the communication time interval.

Optionally, the default value of the communication time interval may not be received by the terminal from the access network device, but is configured by the terminal according to a protocol.

Optionally, the first information may include different value sets of a same communication time interval. The different value sets of the same communication time interval correspond to different physical layer transmission formats. The terminal may determine, based on a physical layer transmission format of the terminal, a value set, where the second information indicates a value in the value set.

According to a third aspect, this application provides a communication method. The communication method includes: sending, by an access network device, a processing time of the access network device to the terminal.

This enables the terminal to determine timing duration of a HARQ RTT timer based on the processing time of the access network device. Energy consumption of the terminal can be reduced, and in addition, accuracy of communication between the terminal and the access network device can be improved.

The processing time of the access network device may indicate a required shortest time from the access network device receives HARQ feedback information sent by the terminal to the access network device schedules the terminal to perform downlink data retransmission or new transmission, or indicate a required shortest time from the access network device receives uplink data sent by the terminal to the access network device sends HARQ feedback information of the uplink data.

Specifically, the access network device may send the processing time of the access network device to the terminal by using an RRC message.

According to a fourth aspect, this application provides a communication method. The communication method includes: determining, by a terminal, timing duration of a HARQ RTT timer based on a processing time of an access network device.

The terminal may determine the timing duration of the HARQ RTT timer based on the processing time of the access network device. Energy consumption of the terminal can be reduced, and in addition, accuracy of communication between the terminal and the access network device can be improved.

The processing time of the access network device may indicate a required shortest time from the access network device receives HARQ feedback information sent by the terminal to the access network device schedules the terminal to perform downlink data retransmission or new transmission, or indicate a required shortest time from the access network device receives uplink data sent by the terminal to the access network device sends HARQ feedback information of the uplink data.

With reference to the fourth aspect, in a first possible implementation, the communication method further includes: receiving, by the terminal, the processing time of the access network device that is sent by the access network device.

Specifically, the terminal may receive, by using an RRC message, the processing time of the access network device that is sent by the access network device.

Optionally, the processing time of the access network device may be preconfigured on the terminal. For example, the processing time of the access network device may be configured on the terminal according to a communication protocol or a communication standard. In this way, signaling can be reduced.

With reference to the fourth aspect or the first possible implementation, a second possible implementation, the determining, by a terminal, timing duration of a HARQ RTT timer based on a processing time of an access network device includes: determining, by the terminal, the processing time of the access network device as timing duration of an uplink HARQ RTT timer of the terminal.

The communication method further includes: starting, by the terminal, the uplink HARQ RTT timer in a subframe in which uplink data is sent, or in a transmission time interval in which uplink data is sent, or in a slot in which uplink data, is sent, or in the first symbol after uplink data is sent.

With reference to any one of the fourth aspect or the foregoing possible implementations, in a third possible implementation, the determining, by a terminal, timing duration of a HARQ RTT tinier based on a processing time of an access network device includes: determining, by the terminal, N1+Δ as timing duration of a downlink HARQ RTT timer of the terminal, where Δ indicates the processing time of the access network device, and N1 is a minimum time interval from the terminal receives downlink data to the terminal sends a HARQ feedback of the downlink data.

The communication method further includes: starting, by the terminal, the downlink HARQ RTT timer in a subframe in which first downlink data is received, or in a transmission time interval in which first downlink data is received, or in a slot in which first downlink data is received, or in the first symbol after first downlink data is received.

With reference to the third possible implementation, in a fourth possible implementation, the communication method further includes: starting, by the terminal, a retransmission timer in the subframe in which the first downlink data is received, or in the transmission time interval in which the first downlink data is received, or at a moment N1+Δ after the slot in which the first downlink data is received, or at a moment N1+Δ after the first symbol after the first downlink data is received.

According to a fifth aspect, this application provides an access network device. The access network device includes a module configured to perform the communication method in any one of the first aspect or the possible implementations of the first aspect. The module included in the access network device may be implemented in a software and/or hardware manner.

According to a sixth aspect, this application provides a terminal. The terminal includes a module configured to perform the communication method in any one of the second aspect or the possible implementations of the second aspect. The module included in the terminal may be implemented in a software and/or hardware manner.

According to a seventh aspect, this application provides an access network device. The access network device includes a module configured to perform the communication method in any one of the third aspect or the possible implementations of the third aspect. The module included in the access network device may be implemented in a software and/or hardware manner.

According to an eighth aspect, this application provides a terminal. The terminal includes a module configured to perform the communication method in any one of the fourth aspect or the possible implementations of the fourth aspect. The module included in the terminal may be implemented in a software and/or hardware manner.

According to a ninth aspect, this application provides an access network device. The access network device includes a processor, a transmitter, and a receiver. The processor is configured to execute a program. When the processor executes code, the processor, the transmitter, and the receiver implement the communication method in any one of the first aspect or the possible implementations of the first aspect.

Optionally, the access network device may further include a memory, and the memory is configured to store the code executed by the processor.

According to a tenth aspect, this application provides a terminal. The terminal includes a processor, a receiver, and a transmitter. The processor is configured to execute a program. When the processor executes code, the processor, the receiver, and the transmitter implement the communication method in any one of the second aspect or the possible implementations of the second aspect.

Optionally, the terminal may further include a memory, and the memory is configured to store the code executed by the processor.

According to an eleventh aspect, this application provides an access network device. The access network device includes a processor, a transmitter, and a receiver. The processor is configured to execute a program. When the processor executes code, the processor, the transmitter, and the receiver implement the communication method in any one of the third aspect or the possible implementations of the third aspect.

Optionally, the access network device may further include a memory, and the memory is configured to store the code executed by the processor.

According to a twelfth aspect, this application provides a terminal. The terminal includes a processor, a receiver, and a transmitter. The processor is configured to execute a program. When the processor executes code, the processor, the receiver, and the transmitter implement the communication method in any one of the fourth aspect or the possible implementations of the fourth aspect.

Optionally, the terminal may further include a memory, and the memory is configured to store the code executed by the processor.

According to a thirteenth aspect, this application provides a computer-readable storage medium. The computer-readable storage medium stores program code to be executed by an access network device. The program code includes an instruction used to perform the communication method in any one of the first aspect or the possible implementations of the first aspect.

According to a fourteenth aspect, this application provides a computer-readable storage medium. The computer-readable storage medium stores program code to be executed by a terminal. The program code includes an instruction used to perform the communication method in any one of the second aspect or the possible implementations of the second aspect.

According to a fifteenth aspect, this application provides a computer-readable storage medium. The computer-readable storage medium stores program code to be executed by an access network device. The program code includes an instruction used to perform the communication method in any one of the third aspect or the possible implementations of the third aspect.

According to a sixteenth aspect, this application provides a computer-readable storage medium. The computer-readable storage medium stores program code to be executed by a terminal. The program code includes an instruction used to perform the communication method in any one of the fourth aspect or the possible implementations of the fourth aspect.

According to a seventeenth aspect, this application provides a computer program product including an instruction.

When the computer program product is run on an access network device, the access network device is enabled to perform the communication method in any one of the first aspect or the possible implementations of the first aspect.

According to an eighteenth aspect, this application provides a computer program product including an instruction. When the computer program product is run on a terminal, the terminal is enabled to perform the communication method in any one of the second aspect or the possible implementations of the second aspect.

According to a nineteenth aspect, this application provides a computer program product including an instruction. When the computer program product is run on an access network device, the access network device is enabled to perform the communication method in any one of the third aspect or the possible implementations of the third aspect.

According to a twentieth aspect, this application provides a computer program product including an instruction. When the computer program product is run on a terminal, the terminal is enabled to perform the communication method in any one of the fourth aspect or the possible implementations of the fourth aspect.

According to a twenty-first aspect, a system chip is provided. The system chip includes an input/output interface, at least one processor, at least one memory, and a bus. The at least one memory is configured to store an instruction, and the at least one processor is configured to invoke the instruction in the at least one memory, to perform operations in the communication methods in the foregoing aspects.

BRIEF DESCRIPTION OF DRAWINGS

FIG. 1 is a schematic diagram of a system architecture of an application scenario of a communication method according to an embodiment of this application;

FIG. 2 is a schematic flowchart of a communication method according to an embodiment of this application;

DESCRIPTION OF EMBODIMENTS

Figure 3:
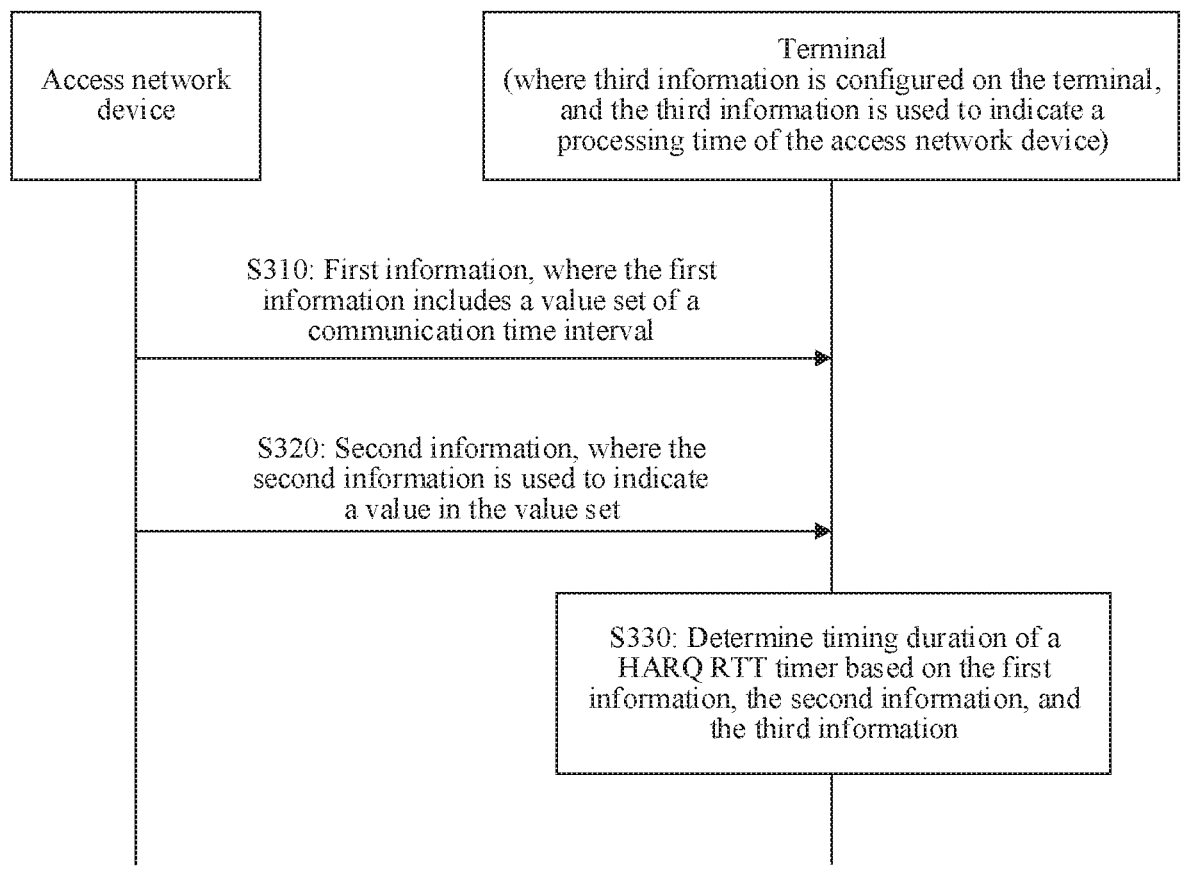
FIG. 3 is a schematic flowchart of a communication method according to an embodiment of this application.

The following describes technical solutions in this application with reference to the accompanying drawings.

As shown in FIG. 1, a communications system to which a communication method in the embodiments of this application can be applied may include a terminal 110 and an access network device 120.

The terminal 110 may be user equipment (user equipment, UE). The UE may communicate with one or more core networks (core network, CN) through the AN 120. The UE may be referred to as an access terminal, a terminal device, a subscriber unit, a subscriber station, a mobile station, a remote station, a remote terminal, a mobile device, a user terminal, a radio network device, a user agent, or a user apparatus. The UE may be a cellular phone, a cordless phone, a session initiation protocol (session initiation protocol, SIP) phone, a wireless local loop (wireless local loop, WLL) station, a personal digital assistant (personal digital assistant, PDA), a handheld device having a wireless communication function, a computing device, another device connected to a wireless modem, a vehicle-mounted device, a wearable device, a terminal device in the Internet of Things or a vehicle network, any form of terminal device in a future network, or the like.

The access network device 120 may be specifically a radio access network (radio access network, RAN) device. An example of the access network device 120 is a base station. It should be understood that a specific type of the base station is not limited in this embodiment of this application. In systems using different radio access technologies, names of devices having functions of the base station may vary. For ease of description, in all the embodiments of this application, all the foregoing apparatuses that provide a wireless communication function for the terminal are collectively referred to as a base station.

The base station (base station, BS) may also be referred to as a base station device, is a device that connects a terminal to a wireless network, and includes but is not limited to a transmission reception point (transmission reception point, TRP), a NodeB in 5G (gNB), an evolved NodeB (evolved NodeB, eNB), a radio network controller (radio network controller, RNC), a NodeB (NodeB, NB), a base station controller (base Station controller, BSC), a base transceiver station (base transceiver station, BTS), a home eNodeB (for example, a home evolved NodeB, or a home NodeB, HNB), a baseband unit (baseband unit, BBU), a Wi-Fi access point (access point, AP), a pico (pico) base station device, or the like.

It should be understood that the embodiments of this application are not limited to a system architecture shown in FIG. 1. In addition, an apparatus in FIG. 1 may be hardware, or may be software divided based on functions, or a combination thereof.

FIG. 2 is a schematic flowchart of a communication method according to an embodiment of this application. It should be understood that FIG. 2 shows steps or operations of the communication method, but these steps or operations are merely examples. In this embodiment of this application, other operations or variations of the operations in FIG. 2 may alternatively be performed, in addition, the steps in FIG. 2 may be performed in a sequence different from that presented in FIG. 2, and possibly not all the operations in FIG. 2 need to be performed.

S210: An access network device sends first information to a terminal, where the first information includes a value set of a communication time interval.

The communication time interval includes at least one of the following time intervals: a time interval from the terminal receives downlink scheduling grant information sent by the access network device to the terminal receives first downlink data scheduled by using the downlink scheduling grant information, a time interval from the terminal receives second downlink data sent by the access network device to the terminal sends HARQ feedback information of the second downlink data, and a time interval from the terminal receives first uplink scheduling grant information sent by the access network device to the terminal sends uplink data scheduled by using the first uplink scheduling grant information.

Correspondingly, the terminal receives the first information sent by the access network device.

A time interval from the terminal receives downlink scheduling grant information sent by the access network device to the terminal receives downlink data scheduled by using the downlink scheduling grant information may be referred to as a first time interval.

A time interval from the terminal receives downlink data sent by the access network device to the terminal sends HARQ feedback information of the downlink data may be referred to as a second time interval.

A time interval from the terminal receives uplink scheduling grant information sent by the access network device to the terminal sends uplink data scheduled by using the uplink scheduling grant information may be referred to as a third time interval.

For example, when the communication time interval includes the first time interval and the second time interval, the first information may include two value sets. One value set is a value set of the first time interval, and the other value set is a value set of the second time interval.

An example of the value set of the first time interval is {a, b, c}, and an example of the value set of the second time interval is {d, e, f, g}. Any one of a, b, c, d, e, f, and g may be an integer, a decimal, or a fraction.

In this case, a value of the first time interval used by the terminal to determine timing duration of a HARQ RTT timer may be obtained from {a, b, c}, and a value of the used second time interval may be obtained from {d, e, f, g}.

A value in a value set of a communication time interval usually corresponds to a time unit. The time unit may be any one of a symbol (symbol), a slot (slot), a minimum slot (min-slot), a subframe (sub-frame), a transmission time interval (transmission time interval, TTI), and an absolute time unit (for example, millisecond or second).

However, time units corresponding to values in value sets of different communication time intervals may be the same or may be different. Quantities of the values included in the value sets of the different communication time intervals may be the same or may be different.

For example, a time unit corresponding to each value in the value set {a, b, c} of the first time interval may be a subframe, and a time unit corresponding to each value in the value set {d, e, f, g} of the second time interval may be a slot.

A specific time unit corresponding to a value of each communication time interval may be preconfigured on the terminal, or may be configured by the access network device by sending information to the terminal.

Optionally, that an access network device sends first information to a terminal may include: sending, by the access network device, the first information to the terminal by using an RRC message, a MAC message, or a MAC CE.

Correspondingly, the terminal receives, by using the RRC message, the MAC message, or the MAC CE, the first information sent by the access network device.

S220: The access network device sends second information to the terminal, where the second information is used to indicate a value of the communication time interval, the value belongs to the value set, and the value is used to determine the timing duration of the HARQ round trip time RTT timer.

Correspondingly, the terminal receives the second information sent by the access network device.

Specifically, after sending the value set of the communication time interval to the terminal in S210, the access network device further indicates, in S220, a value that is in the value set and that can be used by the terminal to determine the timing duration of the HARQ RTT timer.

The second information may specifically indicate an index, in the value set, of the value of the communication time interval that is used by the terminal to determine the timing duration of the HARQ RTT timer.

For example, when the first information includes the value set {a, b, c} of the first time interval and the value set {d, e, f, g} of the second time interval, the second information may include two indexes, for example, 2 and 3. Therefore, the first time interval used by the terminal to determine the timing duration of the HARQ RTT timer is the second value in {a, b, c,} that is, b, and the second time interval used by the terminal to determine the timing duration of the HARQ RTT timer is the third value in {d, e, f, g} that is, f.

The HARQ RTT timer may include a UL HARQ RTT timer and/or a DL HARQ RTT timer.

Optionally, that the access network device sends second information to the terminal may include: sending, by the access network device, the second information to the terminal by using physical layer signaling such as DCI or UCI.

Correspondingly, that the terminal receives the second information sent by the access network device may include: receiving, by the terminal by using the physical layer signaling such as the DCI or the UCI, the second information sent by the access network device.

S230: The terminal determines the timing duration of the HARQ RTT timer based on the first information and the second information.

Specifically, that the terminal determines the timing duration of the HARQ RTT timer based on the first information and the second information may include: after determining the value of the communication time interval in the value set in the first information based on the second information, determining, by the terminal, the timing duration of the HARQ RTT timer based on the value.

For example, after determining that the first time interval is two slots and the second time interval is three symbols, the terminal may calculate the timing duration of the HARQ RTT timer based on the two communication time intervals.

In the communication method of this embodiment of this application, the access network device sends the value set of the communication time interval to the terminal, and indicates a value that is in the value set and that should be used when the terminal determines the timing duration of the HARQ RTT timer, so that the terminal can determine the timing duration of the HARQ RTT timer based on the value. In this way, the terminal may perform a related operation only after the HARQ RTT timer completes timing, so that energy consumption of the terminal can be reduced. In addition, this can help the terminal more accurately communicate with the access network device.

In a possible implementation of this embodiment of this application, the communication time interval includes the second time interval. In other words, the first information includes the value set of the second time interval.

In this case, that the terminal determines the timing duration of the HARQ RTT timer based on the first information and the second information may include: determining, by the terminal, a value K1 indicated by the second information in the value set of the second time interval; and determining, by the terminal, K1*N as timing duration of a downlink HARQ RTT timer, where N is a predefined positive integer.

N may be preconfigured on the terminal, or N may be obtained from the access network device by using an RRC message, a MAC message, or the like.

Further, the terminal may start the downlink HARQ RTT timer in a subframe in which downlink data is received, or in a transmission time interval in which downlink data is received, or in a slot in which downlink data is received, or in the first symbol after downlink data is received. For ease of description, the downlink data is referred to as second downlink data.

In another possible implementation of this embodiment of this application, the communication time interval includes the first time interval and the second time interval.

In this case, that the terminal determines the timing duration of the HARQ RTT timer based on the first information and the second information may include: determining, by the terminal, a value K0 indicated by the second information in the value set of the first time interval, and determining a value K1 indicated by the second information in the value set of the second time interval; and determining, by the terminal, K1+K0 as timing duration of a downlink HARQ RTT timer.

Further, K1 and K0 may be included in a same message, or may be included in different messages.

Further, the terminal may start the downlink HARQ RTT timer in a subframe in which the downlink scheduling grant information is received, or in a transmission time interval in which the downlink scheduling grant information is received, or in a slot in which the downlink scheduling grant information is received, or in the first symbol after the downlink scheduling grant information is received.

In addition, the terminal may further start a retransmission timer in the subframe in which the downlink scheduling grant information is received, or in the transmission time interval in which the downlink scheduling grant information is received, or at a moment K1+K0 after the slot in which the downlink scheduling grant information is received, or at a moment K1+K0 after the first symbol after the downlink scheduling grant information is received.

In another possible implementation of this embodiment of this application, the communication time interval includes the second time interval.

In this case, that the terminal determines the timing duration of the HARQ RTT timer based on the first information and the second information may include: determining, by the terminal, a value K1 indicated by the second information in the value set of the second time interval; and determining, by the terminal, K1 as timing duration of a downlink HARQ RTT timer.

Further, the terminal may start the downlink HARQ RTT timer in a subframe in which downlink data is received, or in a transmission time interval in which downlink data is received, or in a slot in which downlink data is received, or in the first symbol after downlink data is received. For ease of description, the downlink data may be referred to as second downlink data.

In addition, the terminal may further start a retransmission timer in the subframe in which the second downlink data is received, or in the transmission time interval in which the second downlink data is received, or at a moment K11 after the slot in which the second downlink data is received, or at a moment K1 after the first symbol after the second downlink data is received.

In another possible implementation of this embodiment of this application, the communication time interval includes the third time interval.

In this case, that the terminal determines the timing duration of the HARQ RTT timer based on the first information and the second information may include: determining, by the terminal, a value K2 indicated by the second information in a value set of the third time interval; and determining, by the terminal, K2 as timing duration of an uplink HARQ RTT timer.

Further, the terminal may start the uplink HARQ RTT timer in a subframe in which uplink scheduling grant information is received, or in a transmission time interval in which uplink scheduling grant information is received, or in a slat in which uplink scheduling grant information is received, or in the first symbol after uplink scheduling grant information is received. For ease of description, the uplink scheduling grant information may be referred to as first uplink scheduling grant information.

In another possible implementation of this embodiment of this application, the communication time interval includes the third time interval.

In this case, that the terminal determines the timing duration of the HARQ RTT timer based on the first information and the second information may include: determining, by the terminal, a value K2 indicated by the second information in a value set of the third time interval; and determining, by the terminal, K2*N as timing duration of an uplink HARQ RTT timer, where N is a predefined positive integer.

Further, the terminal may start the uplink HARQ RTT timer in a subframe in which uplink scheduling grant information is received, or in a transmission time interval in which uplink scheduling grant information is received, or in a slat in which uplink scheduling grant information is received, or in the first symbol after uplink scheduling grant information is received. For ease of description, the uplink scheduling grant information may be referred to as first uplink scheduling grant information.

This embodiment of this application may further include another possible implementation. For example, the communication time interval may include the first time interval and the third time interval, or may include the second time interval and the third time interval. Examples are not listed one by one in this embodiment of this application.

FIG. 3 is a schematic flowchart of a communication method according to an embodiment of this application. It should be understood that FIG. 3 shows steps or operations of the communication method, but these steps or operations are merely examples. In this embodiment of this application, other operations or variations of the operations in FIG. 3 may alternatively be performed. In addition, the steps in FIG. 3 may be performed in a sequence different from that presented in FIG. 3, and possibly not all the operations in FIG. 3 need to be performed.

Third information is configured on a terminal, and the third information is used to indicate a processing time of an access network device. For example, the third information may be configured on the terminal according to a communication protocol or a communication standard.

The processing time of the access network device may indicate a required shortest time from the access network device receives HARQ feedback information sent h the terminal to the access network device schedules the terminal to perform downlink data retransmission or new transmission, or indicate a required shortest time from the access network device receives uplink data sent by the terminal to the access network device sends HARQ feedback information of the uplink data.

S310: The access network device sends first information to the terminal, where the first information includes a value set of a communication time interval.

The communication time interval includes at least one of the following time intervals: a time interval from the terminal receives downlink scheduling grant information sent by the access network device to the terminal receives first downlink data scheduled by using the downlink scheduling grant information, a time interval from the terminal receives second downlink data sent by the access network device to the terminal sends HARQ feedback information of the second downlink data, and a time interval from the terminal receives first uplink scheduling grant information sent by the access network device to the terminal sends uplink data scheduled by using the first uplink scheduling grant information.

Correspondingly, the terminal receives the first information sent by the access network device.

For S310, refer to S210. For brevity, details are not described herein again.

S320: The access network device sends second information to the terminal, where the second information is used to indicate a value of the communication time interval, the value belongs to the value set, and the value is used to determine timing duration of a HARQ round trip time RTT timer.

Correspondingly, the terminal receives the second information sent by the access network device.

For S320, refer to S220. For brevity, details are not described herein again.

S330: The terminal determines the timing duration of the HARQ RTT timer based on the first information, the second information, and the third information.

The terminal further determines the timing duration of the HARQ RTT timer based on the processing time of the access network device in addition to the first information and the second information, and accuracy of communication between the terminal and the access network device can be further improved. In addition, the third information is preconfigured on the terminal, for example, timing duration of a HARQ RTT timer that is predefined in a protocol. The terminal only needs to use the predefined timing duration to set the timing duration of the HARQ RTT timer, so that signaling overheads can be reduced.

In a possible implementation of this embodiment of this application, the communication time interval includes the first time interval and the second time interval.

In this case, that the terminal determines the timing duration of the HARQ RTT timer based on the first information, the second information, and the third information may include: determining, by the terminal, a value K0 indicated by the second information in a value set of the first time interval, and determining a value K1 indicated by the second information in a value set of the second time interval; and determining, by the terminal, K1+K0+$\Delta$ as timing duration of a downlink HARQ RTT timer, where $\Delta$ indicates the processing time of the access network device.

Further, the terminal may start the downlink HARQ RTT tinier in a subframe in which the downlink scheduling grant information is received, or in a transmission time interval in which the downlink scheduling grant information is received, or in a slot in which the downlink scheduling grant information is received, or in the first symbol after the downlink scheduling grant information received.

In addition, the terminal may start a retransmission timer in the subframe in which the downlink scheduling grant information is received, or in the transmission time interval in which the downlink scheduling grant information is received, or at a moment K1+K0+$\Delta$ after the slot in which the downlink scheduling grant information is received, or at a moment K1+K0+$\Delta$ after the first symbol after the downlink scheduling grant information is received.

Further, K1 and K0 may be included in a same message, or may be included in different messages.

In another possible implementation of this embodiment of this application, the communication time interval includes the second time interval.

In this case, that the terminal determines the timing duration of the HARQ RTT timer based on the first information, the second information, and the third information may include: determining, by the terminal, a value K1 indicated by the second information in a value set of the second time interval; and determining, by the terminal, K1+$\Delta$ as timing duration of a downlink HARQ RTT timer, where $\Delta$ indicates the processing time of the access network device.

Further, the terminal may start the downlink HARQ RTT timer in a subframe in which downlink data is received, or in a transmission time interval in which downlink data is received, or in a slot in which downlink data is received, or in the first symbol after downlink data is received. The downlink data may be referred to as second downlink data.

In addition, the terminal may further start a retransmission timer in the subframe in which the second downlink data is received, or in the transmission time interval in which the second downlink data is received, or at a moment K1+$\Delta$ after the slot in which the second downlink data is received, or at a moment K1+$\Delta$ after the first symbol after the second downlink data is received, where $\Delta$ indicates the processing time of the access network device.

In another possible implementation of this embodiment of this application, the communication time interval includes the third time interval.

In this case, that the terminal determines the timing duration of the HARQ RTT timer based on the first information, the second information, and the third information may include: determining, by the terminal, a value K2 indicated by the second information in a value set of the third time interval; and determining, by the terminal, K2+$\Delta$ as timing duration of an uplink HARQ RTT timer, where $\Delta$ indicates the processing time of the access network device.

Further, the terminal may start the uplink HARQ RTT timer in a subframe in which uplink scheduling grant information is received, or in a transmission time interval in which uplink scheduling grant information is received, or in a slot in which uplink scheduling grant information is received, or in the first symbol after uplink scheduling grant information is received. The uplink scheduling grant information may be referred to as first uplink scheduling grant information.

In addition, the terminal may further start a retransmission timer in a subframe in which downlink data is received, or in a transmission time interval in which downlink data is received, or at a moment K2+Δ after a slot in which downlink data is received, or at a moment K2+Δ after the first symbol after downlink data is received, where Δ indicates the processing time of the access network device. The downlink data may be referred to as second downlink data.

This embodiment of this application may further include another possible implementation. For example, the communication time interval may include the first time interval and the third time interval, or may include the second time interval and the third time interval. Examples are not listed one by one in this embodiment of this application.

Figure 4:
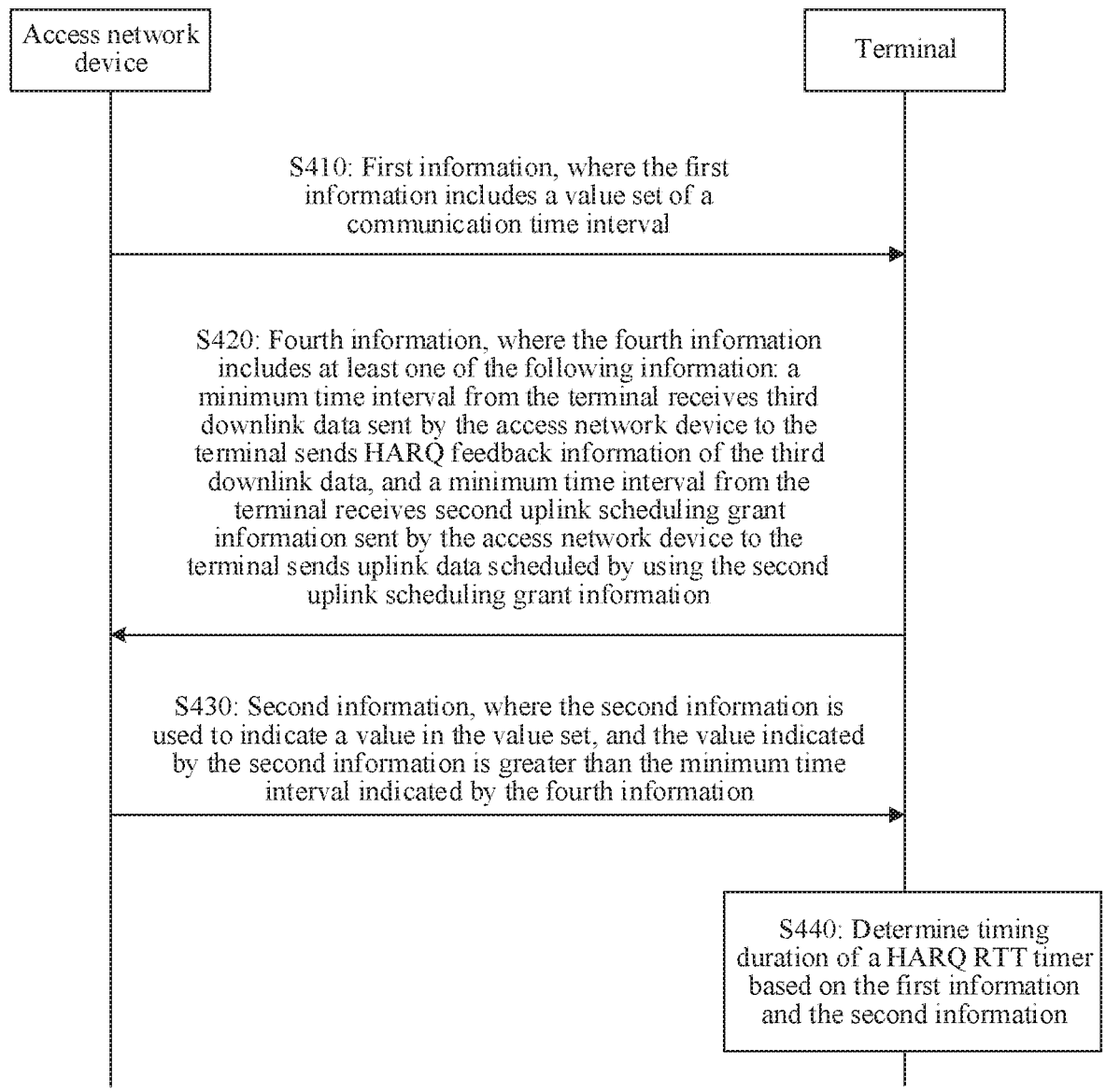
FIG. 4 is a schematic flowchart of a communication method according to an embodiment of this application.

FIG. 4 is a schematic flowchart of a communication method according to an embodiment of this application. It should be understood that FIG. 4 shows steps or operations of the communication method, but these steps or operations are merely examples. In this embodiment of this application, other operations or variations of the operations in FIG. 4 may alternatively be performed. In addition, the steps in FIG. 4 may be performed in a sequence different from that presented in FIG. 3, and possibly not all the operations in FIG. 4 need to be performed.

S410: An access network device sends first information to a terminal, where the first information includes a value set of a communication time interval.

The communication time interval includes at least one of the following time intervals: a first time interval from the terminal receives downlink scheduling grant information sent by the access network device to the terminal receives first downlink data scheduled by using the downlink scheduling grant information, a second time interval from the terminal receives second downlink data sent by the access network device to the terminal sends HARQ feedback information of the second downlink data, and a third time interval from the terminal receives first uplink scheduling grant information sent by the access network device to the terminal sends uplink data scheduled by using the first uplink scheduling grant information.

Correspondingly, the terminal receives the first information sent by the access network device.

For S410, refer to S210. For brevity, details are not described herein again.

S420: The terminal sends fourth information to the access network device, where the fourth information includes at least one of the following information: a minimum time interval from the terminal receives third downlink data sent by the access network device to the terminal sends HARQ feedback information of the third downlink data, and a minimum time interval from the terminal receives second uplink scheduling grant information sent by the access network device to the terminal sends uplink data scheduled by using the second uplink scheduling grant information.

Correspondingly, the access network device receives the fourth information sent by the terminal.

A minimum time interval from the terminal receives downlink data sent by the access network device to the terminal sends HARQ feedback information of the downlink data is referred to as a first minimum time interval. The downlink data may be referred to as third downlink data.

A minimum time interval from the terminal receives uplink scheduling grant information sent by the access network device to the terminal sends uplink data scheduled by using the uplink scheduling grant information may be referred to as a second minimum time interval. The uplink scheduling grant information may be referred to as second uplink scheduling grant information.

The first minimum time interval and/or the second minimum time interval may be referred to as a processing capability of the terminal.

Optionally, the terminal may send the fourth information to the access network device by using an RRC message. Correspondingly, the access network device may receive, by using the RRC message, the fourth information sent by the terminal.

After receiving the fourth information, the access network device may determine second information based on the fourth information. Specifically, the access network device may obtain, based on the processing capability of the terminal, a value of the communication time interval that should be used by the terminal to determine timing duration of a HARQ RTT timer.

For example, when the fourth information includes the first minimum time interval, the access network device may determine an index, in a value set of the second time interval, of a value that is in the value set and that is greater than or equal to a value of the first minimum time interval, and add the index into the second information.

When the fourth information includes the second minimum time interval, the access network device may determine an index, in a value set of the third time interval, of a value that is in the value set and that is greater than or equal to a value of the second minimum time interval, and add the index into the second information.

When the fourth information includes the first minimum time interval and the second minimum time interval, the access network device may determine an index, in a value set of the second time interval, of a value that is in the value set and that is greater than or equal to a value of the first minimum time interval and an index, in a value set of the third time interval, of a value that is in the value set and that is greater than or equal to a value of the second minimum time interval, and add the indexes into the second information.

It should be understood that a sequence of S410 and S420 is not limited in this embodiment of this application.

S430: The access network device sends the second information to the terminal, where the second information is used to indicate the value of the communication time interval, the value belongs to the value set, and the value is used to determine the timing duration of the HARQ round trip time RTT timer.

When the second information is used to indicate a value of the second time interval, the value of the second time interval that is indicated by the second information is greater than or equal to the first minimum time interval.

When the second information is used to indicate a value of the third time interval, the value of the third time interval that is indicated by the second information is greater than or equal to the second minimum time interval.

When the second information is used to indicate a value of the second time interval and a value of the third time interval, the value of the second time interval that is indicated by the second information is greater than or equal to the first minimum time interval, and the value of the third time interval that is indicated by the second information is greater than or equal to the second minimum time interval.

Correspondingly, the terminal receives the second information sent by the access network device.

For S430, refer to S220. For brevity, details are not described herein again.

S440: The terminal determines the timing duration of the HARQ RTT timer based on the first information and the second information.

For S440, refer to S230 and related content. For brevity, details are not described herein again.

A difference between this embodiment of this application and the embodiment shown in FIG. 2 lies in that the terminal reports the processing capability of the terminal to the access network device, and the access network device sends the second information to the terminal based on the processing capability of the terminal, to indicate the value of the communication time interval. In this way, accuracy of communication between the terminal and the access network device can be further improved.

Figure 5:
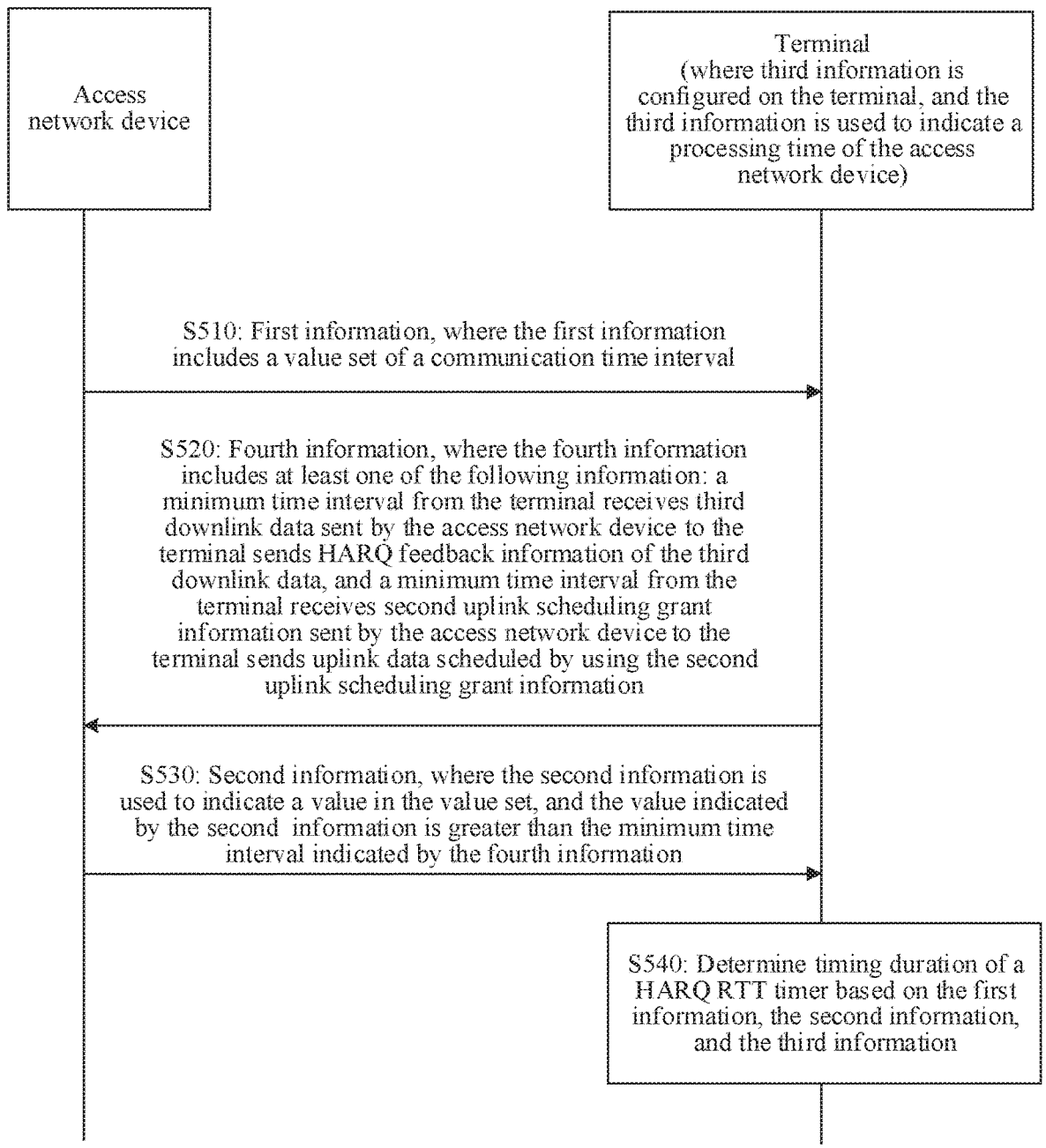
FIG. 5 is a schematic flowchart of a communication method according to an embodiment of this application.

FIG. 5 is a schematic flowchart of a communication method according to an embodiment of this application. It should be understood that FIG. 5 shows steps or operations of the communication method, but these steps or operations are merely examples. In this embodiment of this application, other operations or variations of the operations in FIG. 5 may alternatively be performed. In addition, the steps in FIG. 5 may be performed in a sequence different from that presented in FIG. 5, and possibly not all the operations in FIG. 5 need to be performed.

Third information is configured on a terminal, and the third information is used to indicate a processing time of an access network device. For example, the third information may be configured on the terminal according to a communication protocol or a communication standard.

The processing time of the access network device may indicate a required shortest time from the access network device receives HARQ feedback information sent by the terminal to the access network device schedules the terminal to perform downlink data retransmission or new transmission, or indicate a required shortest time from the access network device receives uplink data sent by the terminal to the access network device sends HARQ feedback information of the uplink data.

S510: The access network device sends first information to the terminal, where the first information includes a value set of a communication time interval.

The communication time interval includes at least one of the following time intervals: a first time interval from the terminal receives downlink scheduling grant information sent by the access network device to the terminal receives first downlink data scheduled by using the downlink scheduling grant information, a second time interval from the terminal receives second downlink data sent by the access network device to the terminal sends HARQ feedback information of the second downlink data, and a third time interval from the terminal receives first uplink scheduling grant information sent by the access network device to the terminal sends uplink data scheduled by using the first uplink scheduling grant information.

Correspondingly, the terminal receives the first information sent by the access network device.

For S510, refer to S210. For brevity, details are not described herein again.

S520: The terminal sends fourth information to the access network device, where the fourth information includes at least one of the following information: a minimum time interval from the terminal receives third downlink data sent by the access network device to the terminal sends HARQ feedback information of the third downlink data, and a minimum time interval from the terminal receives second uplink scheduling grant information sent by the access network device to the terminal sends uplink data scheduled by using the second uplink scheduling grant information.

Correspondingly, the access network device receives the fourth information sent by the terminal.

For S520, refer to S420. For brevity, details are not described herein again.

S530: The access network device sends second information to the terminal, where the second information is used to indicate a value of the communication time interval that is used to determine timing duration of a HARQ RTT timer, the value belongs to the value set included in the first information, and the value indicated by the second information is greater than or equal to a first minimum time interval and/or a second minimum time interval.

Correspondingly, the terminal receives the second information sent by the access network device.

For S530, refer to S220. For brevity, details are not described herein again.

S540: The terminal determines the timing duration of the HARQ RTT timer based on the first information, the second information, and the third information.

For S540, refer to S330 and related content. For brevity, details are not described herein again.

Figure 6:
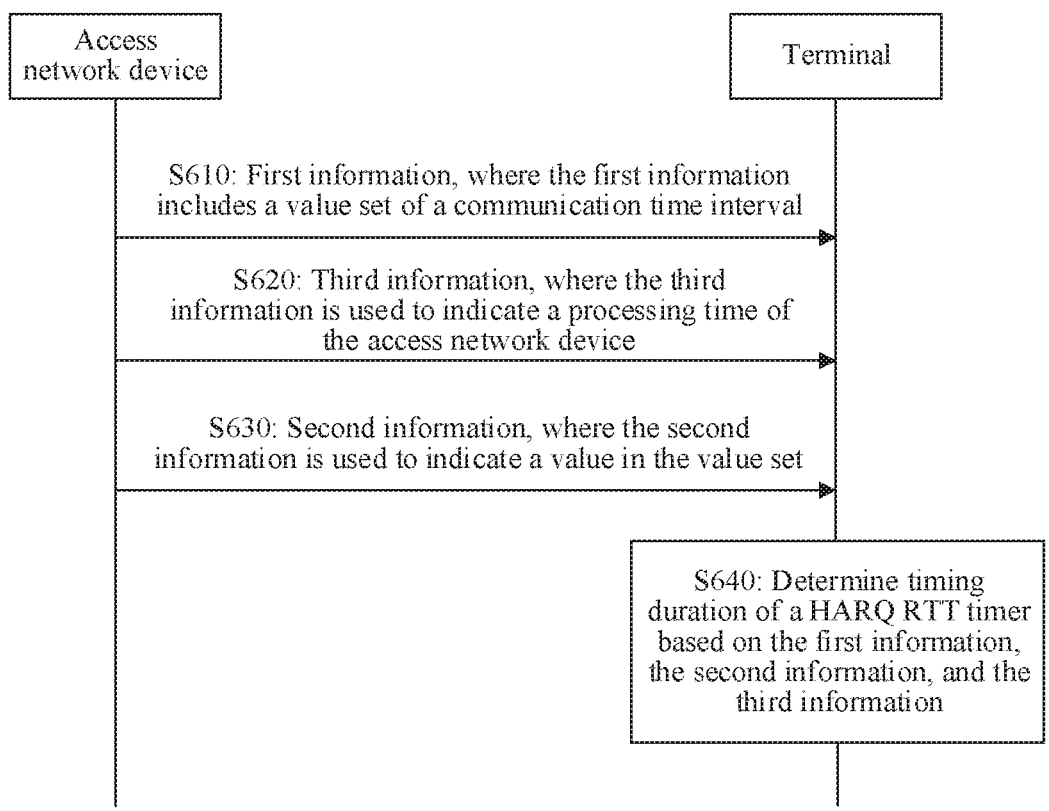
FIG. 6 is a schematic flowchart of a communication method according to an embodiment of this application.

FIG. 6 is a schematic flowchart of a communication method according to an embodiment of this application. It should be understood that FIG. 6 shows steps or operations of the communication method, but these steps or operations are merely examples. In this embodiment of this application, other operations or variations of the operations in FIG. 6 may alternatively be performed. In addition, the steps in FIG. 6 may be performed in a sequence different from that presented in FIG. 6, and possibly not all the operations in FIG. 6 need to be performed.

S610: An access network device sends first information to a terminal, where the first information includes a value set of a communication time interval.

The communication time interval includes at least one of the following time intervals: a first time interval from the terminal receives downlink scheduling grant information sent by the access network device to the terminal receives first downlink data scheduled by using the downlink scheduling grant information, a second time interval from the terminal receives second downlink data sent by the access network device to the terminal sends HARQ feedback information of the second downlink data, and a third time interval from the terminal receives first uplink scheduling grant information sent by the access network device to the terminal sends uplink data scheduled by using the first uplink scheduling grant information.

Correspondingly, the terminal receives the first information sent by the access network device.

For S610, refer to S210. For brevity, details are not described herein again.

S620: The access network device sends third information to the terminal, where the third information is used to indicate a processing time of the access network device.

Correspondingly, the terminal receives the third information sent by the access network device.

Optionally, the access network device may send the third information to the terminal by using an RRC message. Correspondingly, the terminal may receive, by using the RRC message, the third information sent by the access network device.

The processing time of the access network device may indicate a required shortest time from the access network device receives HARQ feedback information sent by the terminal to the access network device schedules the terminal to perform downlink data retransmission or new transmission, or indicate a required shortest time from the access network device receives uplink data sent by the terminal to the access network device sends HARQ feedback information of the uplink data.

It should be understood that a sequence of S610 and S620 is not limited in this embodiment of this application. For example, S620 may be performed before S610.

S630: The access network device sends second information to the terminal, where the second information is used to indicate a value of the communication time interval that is used to determine timing duration of a HARQ RTT timer and that is in the value set included in the first information, and the value indicated by the second information is greater than or equal to a first minimum time interval and/or a second minimum time interval.

Correspondingly, the terminal receives the second information sent by the access network device.

For S630, refer to S220. For brevity, details are not described herein again.

S640: The terminal determines the timing duration of the HARQ RTT timer based on the first information, the second information, and the third information.

For S640, refer to S330 and related content. For brevity, details are not described herein again.

In this embodiment of this application, the third information is received from the access network device. In other words, the access network device may dynamically indicate a processing capability of the access network device, so that the third information used by the terminal to determine the timing duration of the HARQ RTT timer can be more accurate, and communication accuracy can be further improved.

Figure 7:
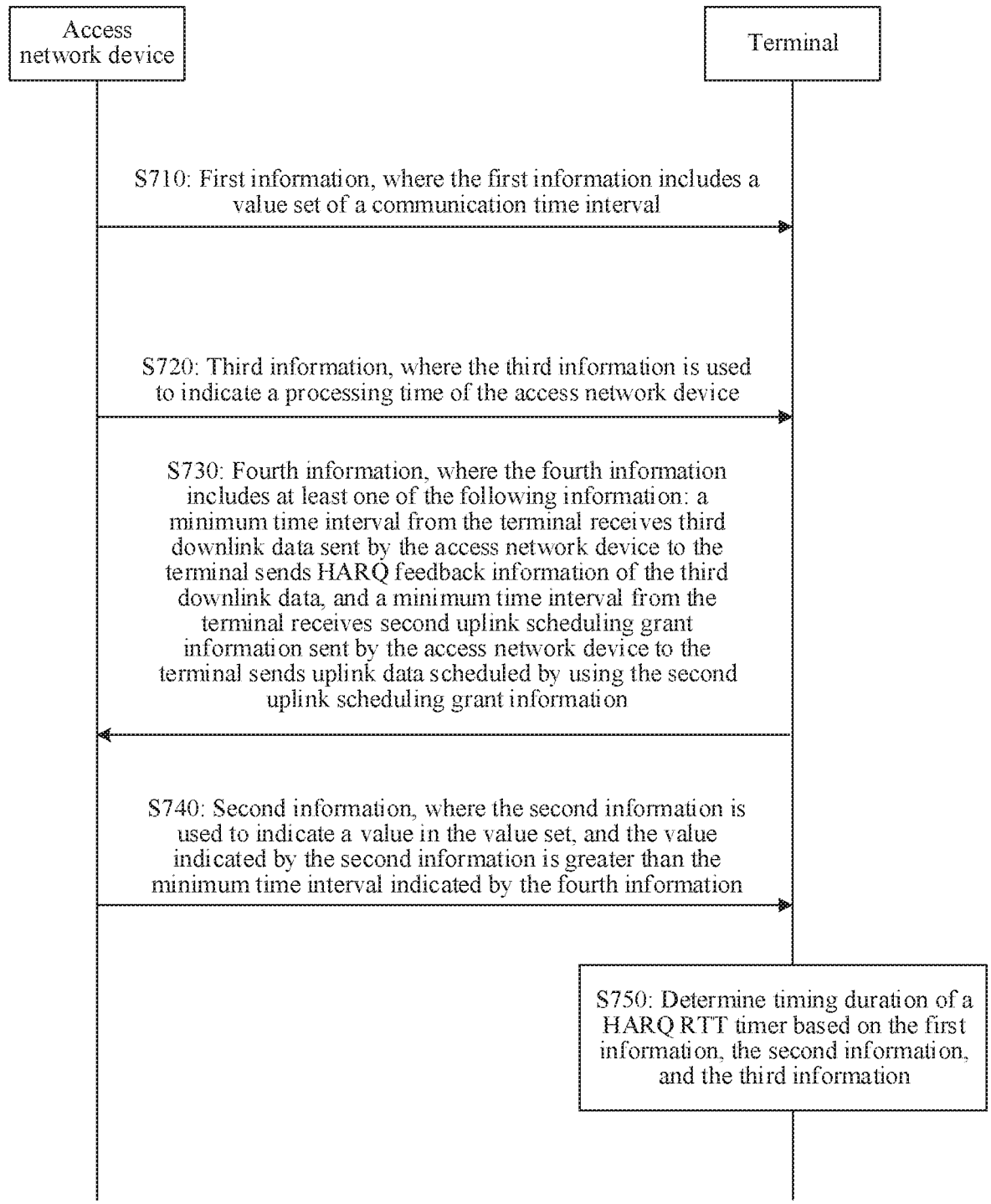
FIG. 7 is a schematic flowchart of a communication method according to an embodiment of this application.

FIG. 7 is a schematic flowchart of a communication method according to an embodiment of this application. It should be understood that FIG. 7 shows steps or operations of the communication method, but these steps or operations are merely examples. In this embodiment of this application, other operations or variations of the operations in FIG. 7 may alternatively be performed. In addition, the steps in FIG. 7 may be performed in a sequence different from that presented in FIG. 7, and possibly not all the operations in FIG. 7 need to be performed.

S710: An access network device sends first information to a terminal, where the first information includes a value set of a communication time interval.

The communication time interval includes at least one of the following time intervals: a first time interval from the terminal receives downlink scheduling grant information sent by the access network device to the terminal receives first downlink data scheduled by using the downlink scheduling grant information, a second time interval from the terminal receives second downlink data sent by the access network device to the terminal sends HARQ feedback information of the second downlink data, and a third time interval from the terminal receives first uplink scheduling grant information sent by the access network device to the terminal sends uplink data scheduled by using the first uplink scheduling grant information.

Correspondingly, the terminal receives the first information sent by the access network device.

For S710, refer to S210. For brevity, details are not described herein again.

S720: The access network device sends third information to the terminal, where the third information is used to indicate a processing time of the access network device.

Correspondingly, the terminal receives the third information sent by the access network device.

For S720, refer to S620. For brevity, details are not described herein again.

S730: The terminal sends fourth information to the access network device, where the fourth information includes at least one of the following information: a minimum time interval from the terminal receives third downlink data sent by the access network device to the terminal sends HARQ feedback information of the third downlink data, and a minimum time interval from the terminal receives second uplink scheduling grant information sent by the access network device to the terminal sends uplink data scheduled by using the second uplink scheduling grant information.

Correspondingly, the access network device receives the fourth information sent by the terminal.

For S730, refer to S420. For brevity, details are not described herein again.

S740: The access network device sends second information to the terminal, where the second information is used to indicate a value of the communication time interval that is used to determine timing duration of a HARQ RTT timer, and the value belongs to the value set included in the first information.

Correspondingly, the terminal receives the second information sent by the access network device.

For S740, refer to S220. For brevity, details are not described herein again.

S750: The terminal determines the timing duration of the HARQ RTT timer based on the first information, the second information, and the third information.

For S750, refer to S330 and related content. For brevity, details are not described herein again.

Figure 8:
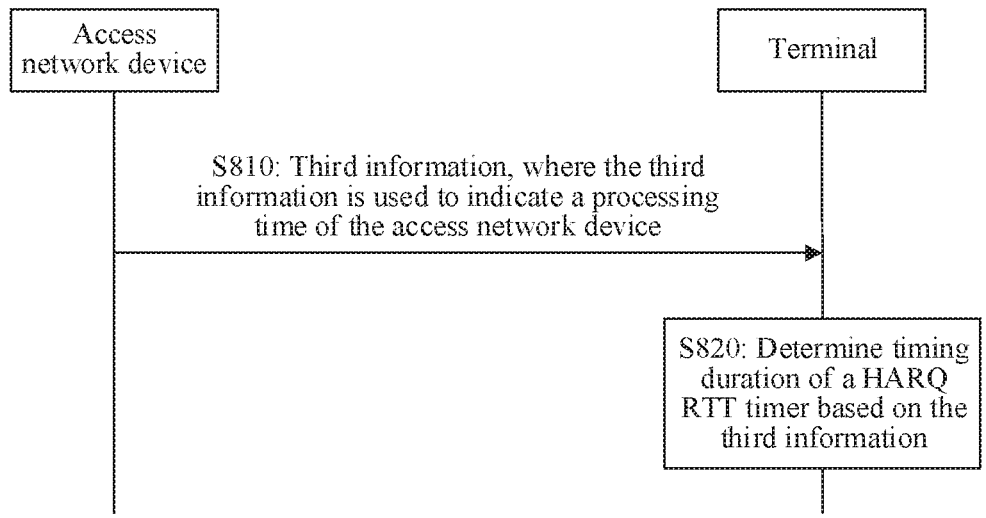
FIG. 8 is a schematic flowchart of a communication method according to an embodiment of this application.

FIG. 8 is a schematic flowchart of a communication method according to an embodiment of this application. It should be understood that FIG. 8 shows steps or operations of the communication method, but these steps or operations are merely examples. In this embodiment of this application, other operations or variations of the operations in FIG. 8 may alternatively be performed. In addition, the steps in FIG. 8 may be performed in a sequence different from that presented in FIG. 8, and possibly not all the operations in FIG. 8 need to be performed.

S810: An access network device sends third information to a terminal, where the third information is used to indicate a processing time of the access network device.

Correspondingly, the terminal receives the third information sent by the access network device.

The processing time of the access network device may indicate a required shortest time from the access network device receives HARQ feedback information sent by the terminal to the access network device schedules the terminal to perform downlink data retransmission or new transmission, or indicate a required shortest time front the access network device receives uplink data sent by the terminal to the access network device sends HARQ feedback information of the uplink data.

For S810, refer to S620. For brevity, details are not described herein again.

S820: The terminal determines timing duration of a HARQ RTT timer based on the third information.

In this embodiment of this application, the terminal determines the tinting duration of the HARQ RTT timer based on the processing time of the access network device. Energy consumption of the terminal can be reduced, and in addition, accuracy of communication between the terminal and the access network device can be improved.

In a possible implementation of this embodiment of this application, that the terminal determines timing duration of a HARQ RTT timer based on the third information may include: determining, by the terminal, the processing time of the access network device as timing duration of an uplink HARQ RTT timer of the terminal.

Further, the terminal may start the uplink HARQ RTT timer in a subframe in which uplink data is sent, or in a transmission time interval in which uplink data is sent, or in a slot in which uplink data is sent, or in the first symbol after uplink data is sent.

In another possible implementation of this embodiment of this application, that the terminal determines timing duration of a HARQ RTT timer based on the third information may include: determining, by the terminal, N1+Δ as timing duration of a downlink HARQ RTT timer of the terminal, where Δ indicates the processing time of the access network device, and N1 is a minimum time interval from the terminal receives downlink data to the terminal sends a HARQ feedback for the downlink data.

Further, the terminal may start the downlink HARQ RTT tinier in a subframe in which the downlink data is received, or in a transmission time interval in which the downlink data is received, or in a slot in which the downlink data is received, or in the first symbol after the downlink data is received. The downlink data may be referred to as first downlink data.

In addition, the terminal may start a retransmission timer in the subframe in which the first downlink data is received, or in the transmission time interval in which the first downlink data. Is received, or at a moment N1+Δ after the slot in which the first downlink data is received, or at a moment N1+Δ after the first symbol after the first downlink data is received.

This embodiment of this application may further include another possible implementation. For example, the communication time interval may include the first time interval and the third time interval, or may include the second time interval and the third time interval. Examples are not listed one by one in this embodiment of this application.

Figure 9:
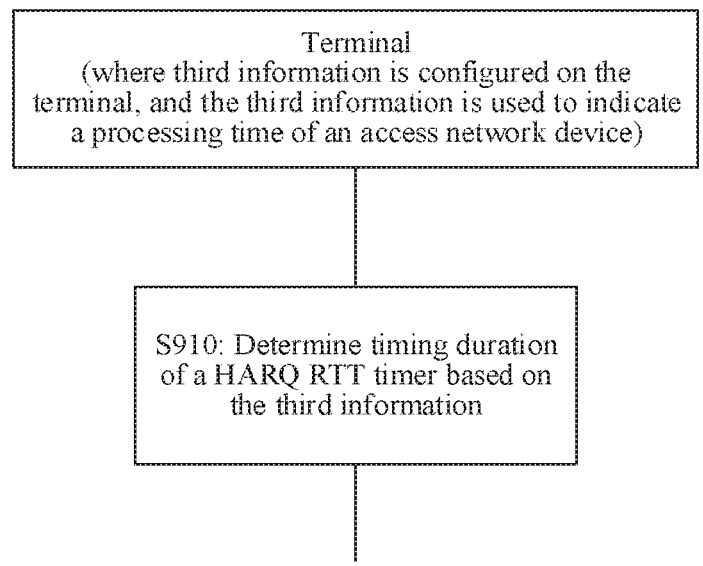
FIG. 9 is a schematic flowchart of a communication method according to an embodiment of this application.

FIG. 9 is a schematic flowchart of a communication method according to an embodiment of this application. It should be understood that FIG. 9 shows steps or operations of the communication method, but these steps or operations are merely examples. In this embodiment of this application, other operations or variations of the operations in FIG. 9 may alternatively be performed. In addition, the steps in FIG. 9 may be performed in a sequence different from that presented in FIG. 9, and possibly not all the operations in FIG. 9 need to be performed.

Third information is configured on a terminal, and the third information is used to indicate a processing time of an access network device. For example, the third information may be configured on the terminal according to a communication protocol or a communication standard.

The processing time of the access network device may indicate a required shortest time from the access network device receives HARQ feedback information sent by the terminal to the access network device schedules the terminal to perform downlink data retransmission or new transmission, or indicate a required shortest time from the access network device receives uplink data sent by the terminal to the access network device sends HARQ feedback information of the uplink data.

S910: The terminal determines timing duration of a HARQ RTT timer based on the third information.

For S910, refer to S820. For brevity, details are not described herein again.

The terminal determines the timing duration of the HARQ RTT timer based on the processing time of the access network device. Energy consumption of the terminal can be reduced, and in addition, accuracy of communication between the terminal and the access network device can be improved.

In the embodiments shown in FIG. 2 to FIG. 9, optionally, for a same communication time interval, there may be a plurality of different value sets on the access network device, and the different value sets correspond to different physical layer transmission formats, that is, neurologies (numerology). For example, the different value sets of the same communication time interval correspond to different subcarrier spacings (sub-carrier spacing, SCS) and/or different transmission time intervals (transmission time interval, TTI).

The access network device may configure an applicable value set for the terminal device. For example, the access network device may determine a proper value set of the communication time interval for the terminal based on a transport layer transmission format currently used by the terminal.

For example, there are two value sets of the first time interval on the access network device. One is a value set 1, and the other one is a value set 2. The value set 1 corresponds to a subcarrier spacing of 15 kilohertz, and the value set 2 corresponds to a subcarrier spacing of 30 kilohertz. When a subcarrier spacing of the terminal is 30 kilohertz, the access network device may determine that the value set of the first time interval of the terminal is the value set 2. In this case, the first information includes the value set 2.

In the embodiments shown in FIG. 2 to FIG. 9, optionally, the access network device may send a default value (Default) of the communication time interval to the terminal by using an air interface message. In this case, if the access network device does not send the second information to the terminal, the terminal may determine the timing duration of the HARQ RTT timer by using the default value of the communication time interval.

Further, the default value of the communication time interval may not be received by the terminal from the access network device, but is configured by the terminal according to a protocol.

In the embodiments shown in FIG. 2 to FIG. 9, optionally, for a same communication time interval, when there are different value sets corresponding to different physical layer transmission formats on the access network device, the access network device may send the different value sets of the same communication time interval to the terminal by using the first information. In this way, when sending the second information to the terminal, the access network device may determine a value set in the plurality of value sets based on a physical layer transmission format of the terminal, then determine a value in the value set, and send the value to the terminal by using the second information. After receiving the second information, the terminal may determine, based on the physical layer transmission format of the terminal, a value set, where the second information indicates a value in the value set.

In the embodiments shown in FIG. 3 and FIG. 5 to FIG. 9, optionally, the terminal may further determine, based on the processing time of the access network device, a waiting time after the terminal completes sending a random access preamble in a random access process and before the terminal starts to receive an RAR message sent by the access network device. A length of the waiting time may be equal to the processing time of the access network device, or equal to (the processing time of the access network device*M), where M may be a positive integer, a fraction, or a decimal.

Optionally, a minimum processing time of the access network device may be 0.

Figure 10:
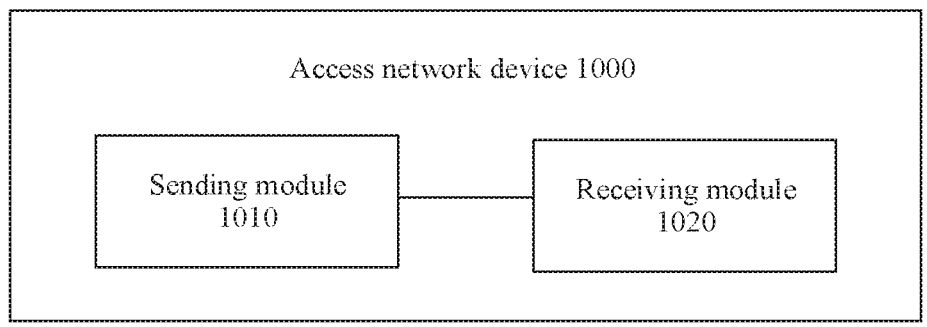
FIG. 10 is a schematic structural diagram of an access network device according to an embodiment of this application.

A schematic structural diagram of an access network device according to an embodiment of this application is shown in FIG. 10. It should be understood that an access network device 1000 shown in FIG. 10 is merely an example. The access network device in this embodiment of this application may further include another module or unit, or include a module with a function similar to that of each module in FIG. 10, or may not necessarily include all modules in FIG. 10.

The access network device 1000 shown in FIG. 10 may implement the operations performed by the access network device in the communication method shown in FIG. 2, FIG. 3, FIG. 4, FIG. 5, FIG. 6, or FIG. 7.

Specifically, a sending module 1010 is configured to send first information to a terminal, where the first information includes a value set of a communication time interval.

The communication time interval includes at least one of the following time intervals: a first time interval from the terminal receives downlink scheduling grant information sent by the access network device to the terminal receives first downlink data scheduled by using the downlink scheduling grant information, a second time interval from the terminal receives second downlink data sent by the access network device to the terminal sends HARQ feedback information of the second downlink data, and a third time interval from the terminal receives first uplink scheduling grant information sent by the access network device to the terminal sends uplink data scheduled by using the first uplink scheduling grant information.

The sending module 1010 is further configured to send second information to the terminal, where the second information is used to indicate a value of the communication time interval, the value belongs to the value set, and the value is used to determine timing duration of a HARQ RTT timer.

The access network device sends the value set of the communication time interval to the terminal, and indicates a value that is in the value set and that should be used when the terminal determines the tinting duration of the HARQ RTT timer, so that the terminal can determine the timing duration of the HARQ RTT timer based on the value. In this way, the terminal may perform a related operation only when the HARQ RTT timer completes timing, so that energy consumption of the terminal can be reduced. In addition, this can help the terminal more accurately communicate with the access network device.

Optionally, the sending module 1010 may be further configured to send third information to the terminal, where the third information is used to indicate a processing time of the access network device.

Optionally, the access network device may further include a receiving module 1020. The receiving module 1020 is configured to receive fourth information sent by the terminal.

The fourth information includes a first minimum time interval from the terminal receives third downlink data sent by the access network device to the terminal sends HARQ feedback information of the third downlink data; and the second information is used to indicate a value of the second time interval, and the value of the second time interval is greater than or equal to the first minimum time interval; or the fourth information includes a second minimum time interval from the terminal receives second uplink scheduling grant information sent by the access network device to the terminal sends uplink data scheduled by using the second uplink scheduling grant information; and the second information is used to indicate a value of the third time interval, and the value of the third time interval is greater than or equal to the second minimum time interval; or the fourth information includes a first minimum time interval from the terminal receives third downlink data sent by the access network device to the terminal sends HARQ feedback information of the third downlink data, and a second minimum time interval from the terminal receives second uplink scheduling grant information sent by the access network device to the terminal sends uplink data scheduled by using the second uplink scheduling grant information; and the second information is used to indicate a value of the second time interval and a value of the third time interval, the value of the second time interval is greater than or equal to the first minimum time interval, and the value of the third time interval is greater than or equal to the second minimum time interval.

Optionally, the second information is used to indicate an index, in the value set, of the value of the communication time interval.

Figure 11:
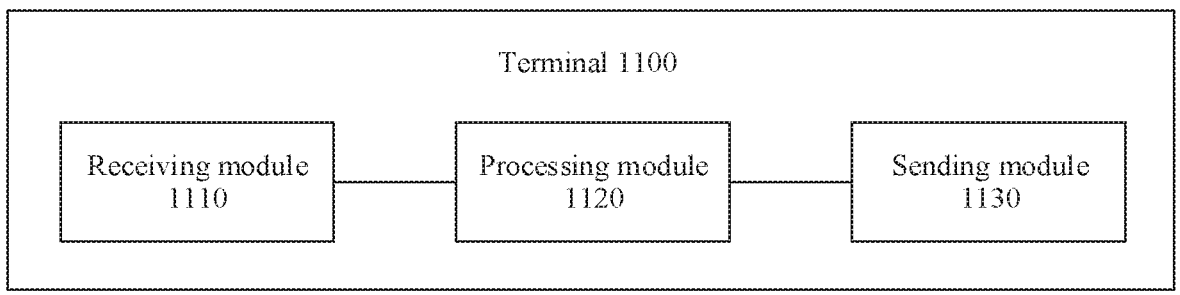
FIG. 11 is a schematic structural diagram of a terminal according to an embodiment of this application.

A schematic structural diagram of a terminal according to an embodiment of this application is shown in FIG. 11. It should be understood that a terminal 1100 shown in FIG. 11 is merely an example. The terminal in this embodiment of this application may further include another module or unit, or include a module with a function similar to that of each module in FIG. 11, or may not necessarily include all modules in FIG. 11.

The terminal 1100 shown in FIG. 11 may implement the operations performed by the terminal in the communication method shown in FIG. 2, FIG. 3, FIG. 4, FIG. 5, FIG. 6, or FIG. 7.

Specifically, a receiving module 1110 is configured to receive first information sent by an access network device, where the first information includes a value set of a communication time interval.

The communication time interval includes at least one of the following time intervals: a first time interval from the terminal receives downlink scheduling grant information sent by the access network device to the terminal receives first downlink data scheduled by using the downlink scheduling grant information, a second time interval from the terminal receives second downlink data sent by the access network device to the terminal sends HARQ feedback information of the second downlink data, and a third time interval from the terminal receives first uplink scheduling grant information sent by the access network device to the terminal sends uplink data scheduled by using the first uplink scheduling grant information.

The receiving module 1110 is further configured to receive second information sent by the access network device, where the second information is used to indicate a value of the communication time interval, the value belongs to the value set, and the value is used to determine timing duration of a HARQ RTT timer.

A processing module 1120 is configured to determine the timing duration of the HARQ RTT timer based on the first information and the second information.

The terminal determines the timing duration of the HARQ RTT timer based on the value of the communication time interval that is indicated by the access network device. This helps reduce energy consumption of the terminal, and in addition, helps improve accuracy of communication between the terminal and the access network device.

Optionally, the processing module 1120 is specifically configured to:

determine the timing duration of the HARQ RTT timer based on the first information, the second information, and third information, where the third information is used to indicate a processing time of the access network device, and the third information is obtained by the terminal from the access network device or is preconfigured on the terminal.

Optionally, the communication time interval includes the first time interval and the second time interval.

Correspondingly, the processing module 1120 is specifically configured to:

determine a value K0 indicated by the second information in a value set of the first time interval, and determine a value K1 indicated by the second information in a value set of the second time interval;

determine K1+K0+Δ as timing duration of a downlink HARQ RTT timer, where Δ indicates the processing time of the access network device; and start the downlink HARQ RTT timer in a subframe in which the downlink scheduling grant information is received, or in a transmission time interval in which the downlink scheduling grant information is received, or in a slot in which the downlink scheduling grant information is received, or in the first symbol after the downlink scheduling grant information is received.

Further, optionally, the processing module 1120 is further configured to:

start a retransmission timer in the subframe in which the downlink scheduling grant information is received, or in the transmission time interval in which the downlink scheduling grant information is received, or at a moment K1+K0+Δ after the slot in which the downlink scheduling grant information is received, or at a moment K1+K1+Δ after the first symbol after the downlink scheduling grant information is received.

Optionally, the communication time interval includes the second time interval.

Correspondingly, the processing module 1120 is specifically configured to:

determine a value K1 indicated by the second information in a value set of the second time interval;

determine K1+Δ as timing duration of a downlink HARQ RTT timer, where Δ indicates the processing time of the access network device; and start the downlink HARQ RTT timer in a subframe in which the second downlink data is received, or in a transmission time interval in which the second downlink data is received, or in a slot in which the second downlink data is received, or in the first symbol after the second downlink data is received.

Optionally, the communication time interval includes the third time interval.

Correspondingly, the processing module 1120 is specifically configured to:

determine a value K2 indicated by the second information in a value set of the third time interval;

determine K2+Δ as timing duration of an uplink HARQ RTT timer, where Δ indicates the processing time of the access network device; and start the uplink HARQ RTT timer in a subframe in which the first uplink scheduling grant information is received, or in a transmission time interval in which the first uplink scheduling grant information is received, or in a slot in which the first uplink scheduling grant information is received, or in the first symbol after the first uplink scheduling grant information is received.

Optionally, the communication time interval includes the second time interval.

Correspondingly, the processing module 1120 is specifically configured to:

determine a value K1 indicated by the second information in a value set of the second time interval;

determine K1*N as tinting duration of a downlink HARQ RTT timer, where N is a predefined positive integer; and start the downlink HARQ RTT timer in a subframe in which the second downlink data is received, or in a transmission time interval in which the second downlink data is received, or in a slot in which the second downlink data is received, or in the first symbol after the second downlink data is received.

Further, optionally, the processing module 1120 is further configured to:

start a retransmission timer in the subframe in which the second downlink data is received, or in the transmission time interval in which the second downlink data is received, or at a moment K1*N+Δ after the slot in which the second downlink data is received, or at a moment K1*N+Δ after the first symbol after the second downlink data is received, where Δ indicates the processing time of the access network device, the processing time of the access network device is obtained by the terminal front the access network device or is preconfigured on the terminal, and N is a predefined positive integer.

Optionally, the communication time interval includes the first time interval and the second time interval.

Correspondingly, the processing module 1120 is specifically configured to:

determine a value K0 indicated by the second information in a value set of the first time interval, and determine a value K1 indicated by the second information in a value set of the second time interval;

determine K1+K0 as timing duration of a downlink HARQ RTT timer; and start the downlink HARQ RTT timer in a subframe in which the downlink scheduling grant information is received, or in a transmission time interval in which the downlink scheduling grant information is received, or in a slot in which the downlink scheduling grant information is received, or in the first symbol after the downlink scheduling grant information is received.

Optionally, the communication time interval includes the second time interval.

Correspondingly, the processing module 1120 is specifically configured to:

determine a value K1 indicated by the second information in a value set of the second time interval;

determine K1 as timing duration of a downlink HARQ RTT timer; and start the downlink HARQ RTT timer in a subframe in which the second downlink data is received, or in a transmission time interval in which the second downlink data is received, or in a slot in which the second downlink data is received, or in the first symbol after the second downlink data is received.

Optionally, the communication time interval includes the third time interval.

Correspondingly, the processing module 1120 is specifically configured to:

determine a value K2 indicated by the second information in a value set of the third time interval;

determine K2 as timing duration of an uplink HARQ RTT timer; and start the uplink HARQ RTT timer in a subframe in which the first uplink scheduling grant information is received, or in a transmission time interval in which the first uplink scheduling grant information is received, or in a slot in which the first uplink scheduling grant information is received, or in the first symbol after the first uplink scheduling grant information is received.

Optionally, the communication time interval includes the third time interval.

Correspondingly, the processing module 1120 is specifically configured to:

determine a value K2 indicated by the second information in a value set of the third time interval;

determine K2*N as timing duration of an uplink HARQ RTT timer, where N is a predefined positive integer; and start the uplink HARQ RTT timer in a subframe in which the first uplink scheduling grant information is received, or in a transmission time interval in which the first uplink scheduling grant information is received, or in a slot in which the first uplink scheduling grant information is received, or in the first symbol after the first uplink scheduling grant information is received.

Optionally, the second information is used to indicate an index, in the value set, of the value of the communication time interval.

Optionally, the terminal further includes a sending module 1130. The sending module 1130 is configured to send fourth information to the access network device.

The fourth information includes a first minimum time interval from the terminal receives third downlink data sent by the access network device to the terminal sends HARQ feedback information of the third downlink data. Correspondingly, the second information is used to indicate a value of the second time interval, and the value of the second time interval is greater than or equal to the first minimum time interval.

Alternatively, the fourth information includes a second minimum time interval from the terminal receives second uplink scheduling grant information sent by the access network device to the terminal sends uplink data scheduled by using the second uplink scheduling grant information. Correspondingly, the second information is used to indicate a value of the third time interval, and the value of the third time interval is greater than or equal to the second minimum time interval.

Alternatively, the fourth information includes a first minimum time interval from the terminal receives third downlink data sent by the access network device to the terminal sends HARQ feedback information of the third downlink data, and a second minimum time interval from the terminal receives second uplink scheduling grant information sent by the access network device to the terminal sends uplink data scheduled by using the second uplink scheduling grant information. Correspondingly, the second information is used to indicate a value of the second time interval and a value of the third time interval, the value of the second time interval is greater than or equal to the first minimum time interval, and the value of the third time interval is greater than or equal to the second minimum time interval.

Figure 12:
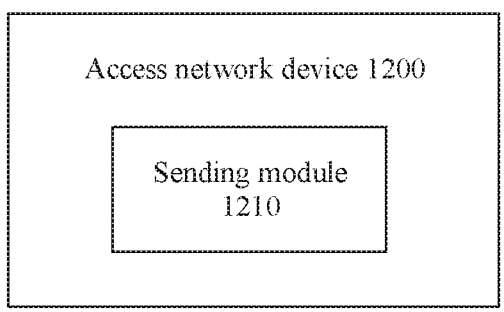
FIG. 12 is a schematic structural diagram of an access network device according to another embodiment of this application.

A schematic structural diagram of an access network device according to an embodiment of this application is shown in FIG. 12. It should be understood that an access network device 1200 shown in FIG. 12 is merely an example. The access network device in this embodiment of this application may further include another module or unit, or include a module with a function similar to that of each module in FIG. 12, or may not necessarily include all modules in FIG. 12.

The access network device 1200 shown in FIG. 11 may implement the operations performed by the access network device in the communication method shown in FIG. 8.

Specifically, a sending module 1210 is configured to send a processing time of the access network device to the terminal.

This enables the terminal to determine timing duration of a HARQ RTT timer based on the processing time of the access network device. Energy consumption of the terminal can be reduced, and in addition, accuracy of communication between the terminal and the access network device can be improved.

The processing time of the access network device may indicate a required shortest time from the access network device receives HARQ feedback information sent by the terminal to the access network device schedules the terminal to perform downlink data retransmission or new transmission, or indicate a required shortest time from the access network device receives uplink data sent by the terminal to the access network device sends HARQ feedback information of the uplink data.

Optionally, the sending module 1210 is specifically configured to send the processing time of the access network device to the terminal by using an RRC message.

Figure 13:
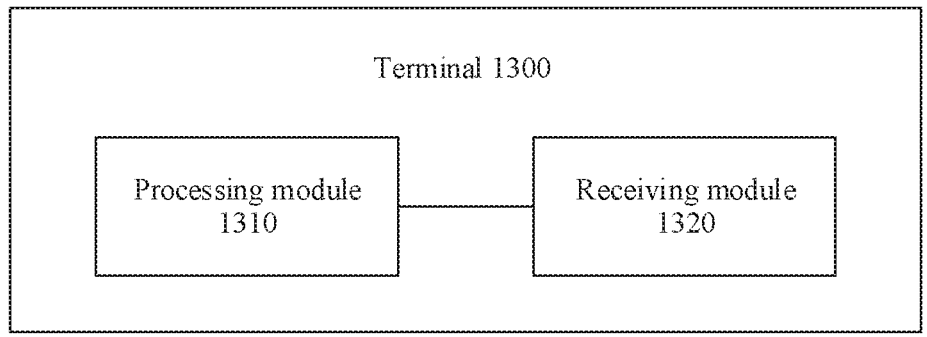
FIG. 13 is a schematic structural diagram of a terminal according to another embodiment of this application.

A schematic structural diagram of a terminal according to an embodiment of this application is shown in FIG. 13. It should be understood that a terminal 1300 shown in FIG. 13 is merely an example. The terminal in this embodiment of this application may further include another module or unit, or include a module with a function similar to that of each module in FIG. 13, or may not necessarily include all modules in FIG. 13.

The terminal 1300 shown in FIG. 13 may implement the operations performed by the terminal in the communication method shown in FIG. 8 or FIG. 9.

Specifically, a processing module 1310 is configured to determine timing duration of a HARQ RTT timer based on a processing time of an access network device.

The terminal may determine the timing duration of the HARQ RTT timer based on the processing time of the access network device. Energy consumption of the terminal can be reduced, and in addition, accuracy of communication between the terminal and the access network device can be improved.

The processing time of the access network device may indicate a required shortest time from the access network device receives HARQ feedback information sent by the terminal to the access network device schedules the terminal to perform downlink data retransmission or new transmission, or indicate a required shortest time from the access network device receives uplink data sent by the terminal to the access network device sends HARQ feedback information of the uplink data.

Optionally, the terminal further includes a receiving module 1320, configured to receive the processing time of the access network device that is sent by the access network device.

Optionally, the receiving module is specifically configured to receive, by using an RRC message, the processing time of the access network device that is sent by the access network device.

Optionally, the processing time of the access network device may be preconfigured on the terminal. For example, the processing time of the access network device may be configured on the terminal according to a communication protocol or a communication standard. In this way, signaling can be reduced.

Optionally, the processing module 1310 is specifically configured to: determine the processing time of the access network device as timing duration of an uplink HARQ RTT timer of the terminal; and start the uplink HARQ RTT timer in a subframe in which uplink data is sent, or in a transmission time interval in which uplink data is sent, or in a slot in which uplink data is sent, or in the first symbol after uplink data is sent.

Optionally, the processing module 1310 is specifically configured to: determine N1+Δ as timing duration of a downlink HARQ RTT timer of the terminal, where Δ indicates the processing time of the access network device, and N1 is a minimum time interval from the terminal receives downlink data to the terminal sends a HARQ feedback of the downlink data; and start the downlink HARQ RTT timer in a subframe in which first downlink data is received, or in a transmission time interval in which first downlink data is received, or in a slot in which first downlink data is received, or in the first symbol after first downlink data is received.

Optionally, the processing module 1310 is further configured to start a retransmission timer in the subframe in which the first downlink data is received, or in the transmission time interval in which the first downlink data is received, or at a moment N1+Δ after the slot in which the first downlink data is received, or at a moment N1+Δ after the first symbol after the first downlink data is received.

Figure 14:
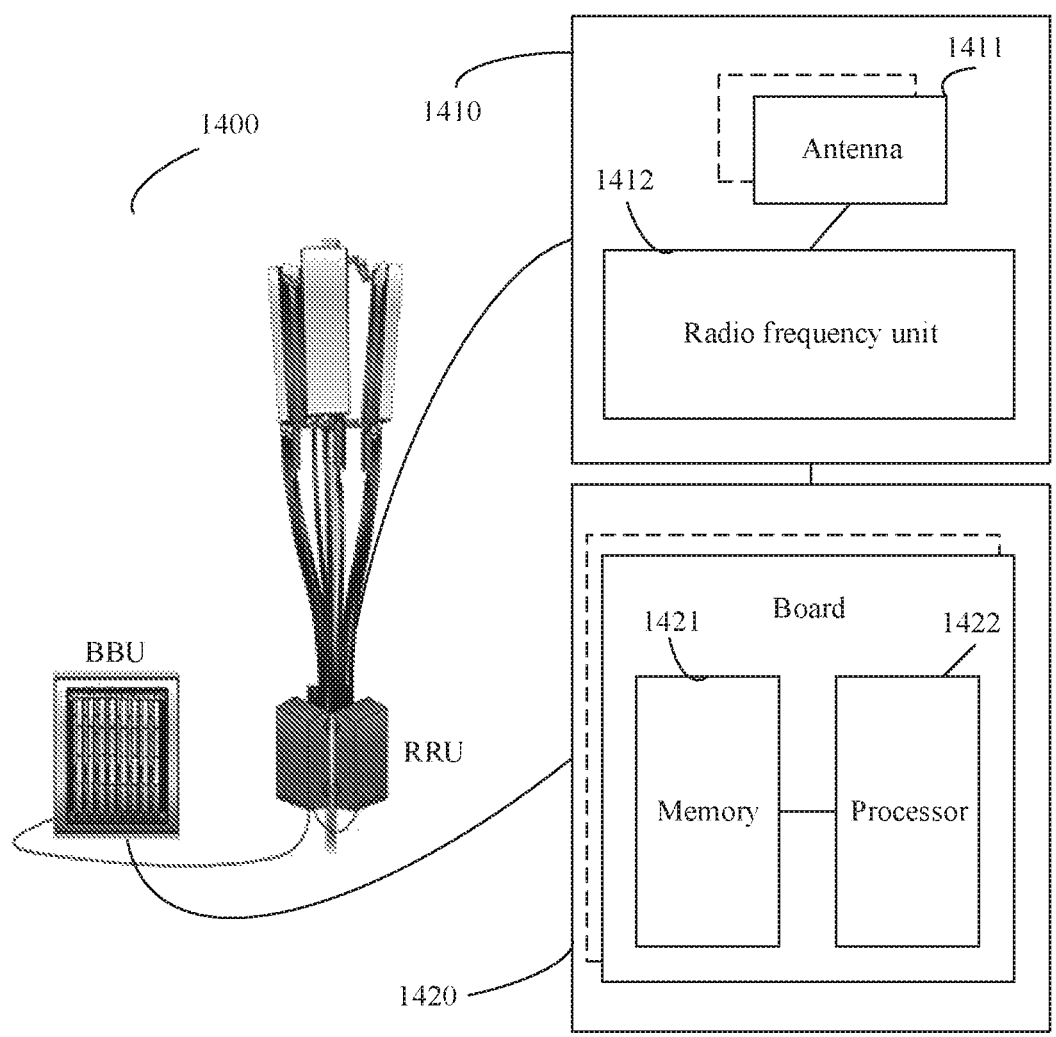
FIG. 14 is a schematic structural diagram of an access network device according to another embodiment of this application.

FIG. 14 is a schematic structural diagram of an access network device 1400. The access network device may be applied to the system shown in FIG. 1. The access network device 1400 includes one or more remote radio units (remote radio unit, RRU) 1410 and one or more baseband units (baseband unit, BBU) 1420.

The RRU 1410 may be referred to as a transceiver unit, a transceiver, a transceiver circuit, or the like, and may include at least one antenna 1411 and a radio frequency unit 1412. The RRU 1410 is mainly configured to send and receive a radio frequency signal and perform conversion between a radio frequency signal and a baseband signal. For example, the RRU 1410 is configured to send a signaling indication or a reference signal in the foregoing embodiments to a terminal.

The BBU 1420 is mainly configured to perform baseband processing, control the access network device, and the like.

The RRU 1410 and the BBU 1420 may be physically disposed together, or may be physically disposed separately, to be specific, may be distributed base stations.

The BBU 1420 is a control center of the access network device, may also be referred to as a processing unit, and is mainly configured to complete a baseband processing function, such as channel coding, multiplexing, modulation, and spectrum spreading.

In an example, the BBU 1420 may include one or more boards. A plurality of boards may jointly support a radio access network (such as a 5G network) of a single access standard, or may separately support radio access networks of different access standards. The BBU 1420 further includes a memory 1421 and a processor 1422. The memory 1421 is configured to store a necessary instruction and data. The processor 1422 is configured to control the access network device to perform a necessary action. The memory 1421 and the processor 1422 may serve one or more boards. In other words, a memory and a processor may be disposed on each board. Alternatively, a plurality of boards may use a same memory and processor. In addition, a necessary circuit is further disposed on each board.

The access network device 1400 shown in FIG. 14 may be configured to perform the steps performed by the access network device in the communication method shown in FIG. 2, FIG. 3, FIG. 4, FIG. 5, FIG. 6, or FIG. 7.

Specifically, the transceiver is configured to send first information to a terminal, where the first information includes a value set of a communication time interval.

The communication time interval includes at least one of the following time intervals: a first time interval from the terminal receives downlink scheduling grant information sent by the access network device to the terminal receives first downlink data scheduled by using the downlink scheduling grant information, a second time interval from the terminal receives second downlink data sent by the access network device to the terminal sends HARQ feedback information of the second downlink data, and a third time interval from the terminal receives first uplink scheduling grant information sent by the access network device to the terminal sends uplink data scheduled by using the first uplink scheduling grant information.

The transceiver is further configured to send second information to the terminal, where the second information is used to indicate a value of the communication time interval, the value belongs to the value set, and the value is used to determine timing duration of a HARQ RTT timer.

Optionally, the transceiver may be further configured to send third information to the terminal, where the third information is used to indicate a processing time of the access network device.

Optionally, the transceiver is further configured to receive fourth information sent by the terminal.

The fourth information includes a first minimum time interval from the terminal receives third downlink data sent by the access network device to the terminal sends HARQ feedback information of the third downlink data; and the second information is used to indicate a value of the second time interval, and the value of the second time interval is greater than or equal to the first minimum time interval; or the fourth information includes a second minimum time interval from the terminal receives second uplink scheduling grant information sent by the access network device to the terminal sends uplink data scheduled by using the second uplink scheduling grant information; and the second information is used to indicate a value of the third time interval, and the value of the third time interval is greater than or equal to the second minimum time interval; or the fourth information includes a first minimum time interval from the terminal receives third downlink data sent by the access network device to the terminal sends HARQ feedback information of the third downlink data, and a second minimum time interval from the terminal receives second uplink scheduling grant information sent by the access network device to the terminal sends uplink data scheduled by using the second uplink scheduling grant information; and the second information is used to indicate a value of the second time interval and a value of the third time interval, the value of the second time interval is greater than or equal to the first minimum time interval, and the value of the third time interval is greater than or equal to the second minimum time interval.

Optionally, the second information is used to indicate an index, in the value set, of the value of the communication time interval.

Figure 15:
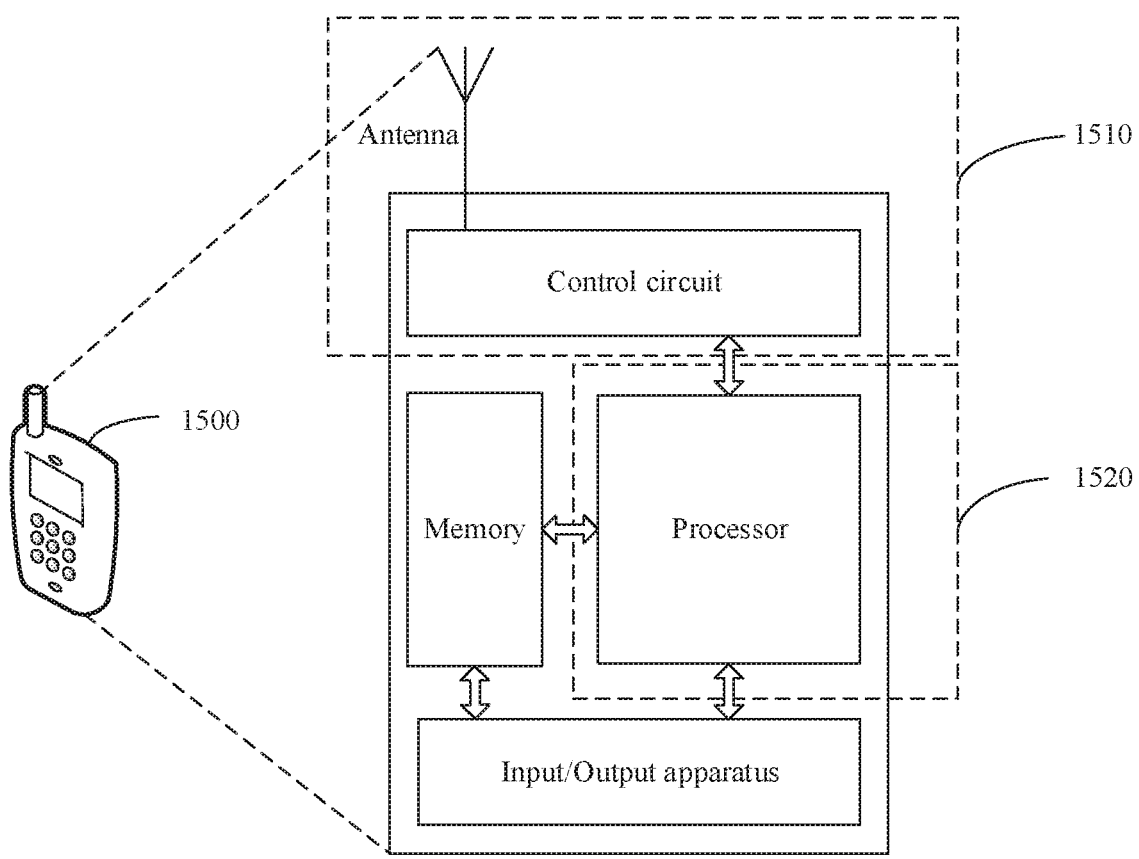
FIG. 15 is a schematic structural diagram of a terminal according to another embodiment of this application.

FIG. 15 is a schematic structural diagram of a terminal 1500. The terminal may be applicable to the system shown in FIG. 1. For ease of description, FIG. 15 shows only main components of the terminal.

As shown in FIG. 15, the terminal 1500 includes a processor, a memory, a control circuit, an antenna, and an input/output apparatus. The processor is mainly configured to: process a communication protocol and communication data, control the entire terminal, execute a software program, and process data of the software program. The memory is mainly configured to store the software program and the data, for example, store a codebook described in the foregoing embodiments. The control circuit is mainly configured to perform conversion between a baseband signal and a radio frequency signal and process the radio frequency signal. The control circuit, together with the antenna, may also be referred to as a transceiver that is mainly configured to send and receive a radio frequency signal in an electromagnetic wave form. The input/output apparatus, such as a touchscreen, a display, or a keyboard, is mainly configured to: receive data entered by a user, and output data to the user.

After the terminal is powered on, the processor may read the software program in a storage unit, interpret and execute an instruction of the software program, and process the data of the software program. When data needs to be sent wirelessly, the processor performs baseband processing on the to-be-sent data, and outputs a baseband signal to a radio frequency circuit. The radio frequency circuit performs radio frequency processing on the baseband signal, and then sends a radio frequency signal in an electromagnetic wave form by using the antenna. When data is sent to the terminal, the radio frequency circuit receives a radio frequency signal by using the antenna, converts the radio frequency signal into a baseband signal, and outputs the baseband signal to the processor. The processor converts the baseband signal into data, and processes the data.

A person skilled in the art may understand that, for ease of description, FIG. 15 shows only one memory and only one processor. Actually, the terminal may include a plurality of processors and a plurality of memories. The memory may also be referred to as a storage medium, a storage device, or the like. This is not limited in this embodiment of this application.

In an optional implementation, the processor may include a baseband processor and a central processing unit. The baseband processor is mainly configured to process the communication protocol and the communication data. The central processing unit is mainly configured to: control the entire terminal, execute the software program, and process the data of the software program. The processor in FIG. 15 integrates functions of the baseband processor and the central processing unit. A person skilled in the art may understand that the baseband processor and the central processing unit may be separate processors, and are interconnected by using a technology such as a bus. A person skilled in the art may understand that the terminal may include a plurality of baseband processors to adapt to different network standards, and the terminal may include a plurality of central processing units to enhance a processing capability of the terminal. The components in the terminal may be connected by using various buses. The baseband processor may also be expressed as a baseband processing circuit or a baseband processing chip. The central processing unit may also be expressed as a central processing circuit or a central processing chip. A function of processing the communication protocol and the communication data may be embedded into the processor, or may be stored in a storage unit in a form of a software program, so that the processor executes the software program to implement a baseband processing function.

For example, in this embodiment of this application, the antenna that has a sending and receiving function and the control circuit may be considered as a transceiver unit of the terminal 1500, and the processor that has a processing function may be considered as a processing unit of the terminal.

As shown in FIG. 15, the terminal 1500 includes the transceiver unit 1510 and the processing unit 1520. The transceiver unit may also be referred to as a transceiver, a transceiver, a transceiver apparatus, or the like. Optionally, a component that is in the transceiver unit 1510 and that is configured to implement a receiving function may be considered as a receiving unit, and a component that is in the transceiver unit 1510 and that is configured to implement a sending function may be considered as a sending unit. In other words, the transceiver unit 1510 includes the receiving unit and the sending unit. For example, the receiving unit may also be referred to as a receiver, a receiver, a receiver circuit, or the like, and the sending unit may be referred to as a transmitter, a transmitter, a transmitter circuit, or the like.

The terminal 1500 shown in FIG. 15 may be configured to implement the steps performed by the terminal in the communication method shown in FIG. 2, FIG. 3, FIG. 4, FIG. 5, FIG. 6, or FIG. 7.

Specifically, the transceiver is configured to receive first information sent by an access network device, where the first information includes a value set of a communication time interval.

The communication time interval includes at least one of the following time intervals: a first time interval from the terminal receives downlink scheduling grant information sent by the access network device to the terminal receives first downlink data scheduled by using the downlink scheduling grant information, a second time interval from the terminal receives second downlink data sent by the access network device to the terminal sends HARQ feedback information of the second downlink data, and a third time interval from the terminal receives first uplink scheduling grant information sent by the access network device to the terminal sends uplink data scheduled by using the first uplink scheduling grant information.

The transceiver is further configured to receive second information sent by the access network device, where the second information is used to indicate a value of the communication time interval, the value belongs to the value set, and the value is used to determine timing duration of a HARQ RTT timer.

The processor is configured to determine the tinting duration of the HARQ RTT timer based on the first information and the second information.

Optionally, the processor is specifically configured to:

determine the timing duration of the HARQ RTT timer based on the first information, the second information, and third information, where the third information is used to indicate a processing time of the access network device, and the third information is obtained by the terminal from the access network device or is preconfigured on the terminal.

Optionally, the communication time interval includes the first time interval and the second time interval.

Correspondingly, the processor is specifically configured to:

determine a value K0 indicated by the second information in a value set of the first time interval, and determine a value K1 indicated by the second information in a value set of the second time interval;

determine K1+K0+Δ as timing duration of a downlink HARQ RTT timer, where Δ indicates the processing time of the access network device; and start the downlink HARQ RTT timer in a subframe in which the downlink scheduling grant information is received, or in a transmission time interval in which the downlink scheduling grant information is received, or in a slot in which the downlink scheduling grant information is received, or in the first symbol after the downlink scheduling grant information is received.

Further, optionally, the processor is further configured to:

start a retransmission timer in the subframe in which the downlink scheduling grant information is received, or in the transmission time interval in which the downlink scheduling grant information is received, or at a moment K1+K0+Δ after the slot in which the downlink scheduling grant information is received, or at a moment K1+K0+Δ after the first symbol after the downlink scheduling grant information is received:

Optionally, the communication time interval includes the second time interval.

Correspondingly, the processor is specifically configured to:

determine a value K1 indicated by the second information in a value set of the second time interval;

determine K1+Δ as timing duration of a downlink HARQ RTT timer, where Δ indicates the processing time of the access network device; and start the downlink HARQ RTT timer in a subframe in which the second downlink data is received, or in a transmission time interval in which the second downlink data is received, or in a slot in which the second downlink data is received, or in the first symbol after the second downlink data is received.

Optionally, the communication time interval includes the third time interval.

Correspondingly, the processor is specifically configured to:

determine a value K2 indicated by the second information in a value set of the third time interval;

determine K2+Δ as timing duration of an uplink HARQ RTT timer, where Δ indicates the processing time of the access network device; and start the uplink HARQ RTT timer in a subframe in which the first uplink scheduling grant information is received, or in a transmission time interval in which the first uplink scheduling grant information is received, or in a slot in which the first uplink scheduling grant information is received, or in the first symbol after the first uplink scheduling grant information is received.

Optionally, the communication time interval includes the second time interval.

Correspondingly, the processor is specifically configured to:

determine a value K1 indicated by the second information in a value set of the second time interval;

determine K1*N as timing duration of a downlink HARQ RTT timer, where N is a predefined positive integer; and start the downlink HARQ RTT tinier in a subframe in which the second downlink data is received, or in a transmission time interval in which the second downlink data is received, or in a slot in which the second downlink data is received, or in the first symbol after the second downlink data is received.

Further, optionally, the processor is further configured to:

start a retransmission tinier in the subframe in which the second downlink data is received, or in the transmission time interval in which the second downlink data is received, or at a moment K1*N+Δ after the slot in which the second downlink data is received, or at a moment K1*N+Δ after the first symbol after the second downlink data is received, where Δ indicates the processing time of the access network device, the processing time of the access network device is obtained by the terminal from the access network device or is preconfigured on the terminal, and N is a predefined positive integer.

Optionally, the communication time interval includes the first time interval and the second time interval.

Correspondingly, the processor is specifically configured to:

determine a value K0 indicated by the second information in a value set of the first time interval, and determine a value K1 indicated by the second information in a value set of the second time interval;

determine K1+K0 as timing duration of a downlink HARQ RTT timer; and start the downlink HARQ RTT timer in a subframe in which the downlink scheduling grant information is received, or in a transmission time interval in which the downlink scheduling grant information is received, or in a slot in which the downlink scheduling grant information is received, or in the first symbol after the downlink scheduling grant information is received.

Optionally, the communication time interval includes the second time interval.

Correspondingly, the processor is specifically configured to:

determine a value K1 indicated by the second information in a value set of the second time interval;

determine K1 as timing duration of a downlink HARQ RTT timer; and start the downlink HARQ RTT timer in a subframe in which the second downlink data is received, or in a transmission time interval in which the second downlink data is received, or in a slot in which the second downlink data is received, or in the first symbol after the second downlink data is received.

Optionally, the communication time interval includes the third time interval.

Correspondingly, the processor is specifically configured to:

determine a value K2 indicated by the second information in a value set of the third time interval;

determine K2 as timing duration of an uplink HARQ RTT timer; and start the uplink HARQ RTT timer in a subframe in which the first uplink scheduling grant information is received, or in a transmission time interval in which the first uplink scheduling grant information is received, or in a slot in which the first uplink scheduling grant information is received, or in the first symbol after the first uplink scheduling grant information is received.

Optionally, the communication time interval includes the third time interval.

Correspondingly, the processor is specifically configured to:

determine a value K2 indicated by the second information in a value set of the third time interval;

determine K2*N as timing duration of an uplink HARQ RTT timer, where N is a predefined positive integer; and start the uplink HARQ RTT timer in a subframe in which the first uplink scheduling grant information is received, or in a transmission time interval in which the first uplink scheduling grant information is received, or in a slot in which the first uplink scheduling grant information is received, or in the first symbol after the first uplink scheduling grant information is received.

Optionally, the second information is used to indicate an index, in the value set, of the value of the communication time interval.

Optionally, the transceiver is further configured to send fourth information to the access network device.

The fourth information includes a first minimum time interval from the terminal receives third downlink data sent by the access network device to the terminal sends HARQ feedback information of the third downlink data. Correspondingly, the second information is used to indicate a value of the second time interval, and the value of the second time interval is greater than or equal to the first minimum time interval.

Alternatively, the fourth information includes a second minimum time interval from the terminal receives second uplink scheduling grant information sent by the access network device to the terminal sends uplink data scheduled by using the second uplink scheduling grant information. Correspondingly, the second information is used to indicate a value of the time interval, and the value of the third time interval is greater than or equal to the second minimum time interval.

Alternatively, the fourth information includes a first minimum time interval from the terminal receives third downlink data sent by the access network device to the terminal sends HARQ feedback information of the third downlink data, and a second minimum time interval from the terminal receives second uplink scheduling grant information sent by the access network device to the terminal sends uplink data scheduled by using the second uplink scheduling grant information. Correspondingly, the second information is used to indicate a value of the second time interval and a value of the third time interval, the value of the second time interval is greater than or equal to the first minimum time interval, and the value of the third time interval is greater than or equal to the second minimum time interval.

The access network device shown in FIG. 14 may perform the steps performed by the access network device in the communication method shown in FIG. 8. Specifically, the transceiver is configured to send the processing time of the access network device to the terminal.

Optionally, the transceiver is specifically configured to send the processing time of the access network device to the terminal by using an RRC message.

The terminal shown in FIG. 15 may perform the steps performed by the terminal in the communication method shown in FIG. 8 or FIG. 9. Specifically, the processor is configured to determine the tinting duration of the HARQ RTT timer based on the processing time of the access network device.

Optionally, the processor is configured to receive the processing time of the access network device that is sent by the access network device.

Optionally, the transceiver is specifically configured to receive, by using the RRC message, the processing time of the access network device that is sent by the access network device.

Optionally, the processing time of the access network device may be preconfigured on the terminal. For example, the processing time of the access network device may be configured on the terminal according to a communication protocol or a communication standard. In this way, signaling can be reduced.

Optionally, the processor is specifically configured to: determine the processing time of the access network device as timing duration of an uplink HARQ RTT timer of the terminal; and start the uplink HARQ RTT timer in a subframe in which uplink data is sent, or in a transmission time interval in which uplink data is sent, or in a slot in which uplink data is sent, or in the first symbol after uplink data is sent.

Optionally, the processor is specifically configured to: determine $N1+\Delta$ as timing duration of a downlink HARQ RTT timer of the terminal, where $\Delta$ indicates the processing time of the access network device, and N1 is a minimum time interval from the terminal receives downlink data to the terminal sends a HARQ feedback of the downlink data; and start the downlink HARQ RTT timer in a subframe in which first downlink data is received, or in a transmission time interval in which first downlink data is received, or in a slot in which first downlink data is received, or in the first symbol after first downlink data is received.

Optionally, the processor is further configured to start a retransmission timer in the subframe in which the first downlink data is received, or in the transmission time interval in which the first downlink data is received, or at a moment $N1+\Delta$ after the slot in which the first downlink data is received, or at a moment $N1+\Delta$ after the first symbol after the first downlink data is received.

Figure 16:
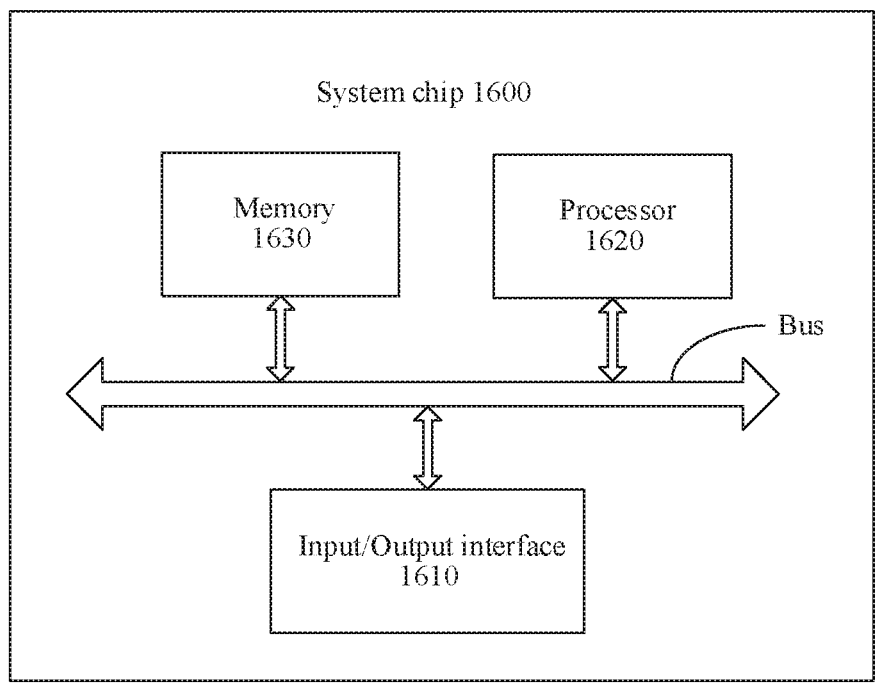
FIG. 16 is a schematic structural diagram of a system chip according to an embodiment of this application.

As shown in FIG. 16, an embodiment of this application further provides a system chip 1600. The system chip includes an input/output interface 1610, at least one processor 1620, at least one memory 1630, and a bus. The at least one memory is configured to store an instruction, the at least one processor is configured to invoke the instruction of the at least one memory, to perform the operations in the communication method shown in FIG. 2, FIG. 3, FIG. 4, FIG. 5, FIG. 6, FIG. 7, FIG. 8, or FIG. 9.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive Solid State Disk (SSD)), or the like.

What is claimed is:

1. An access network device, comprising:
   at least one processor; and
   a non-transitory computer-readable storage medium coupled to the at least one processor and storing programming instructions for execution by the at least one processor, wherein the programming instructions instruct the access network device to:
   send first information to a terminal, wherein the first information comprises a value set from multiple value sets of a communication time interval, wherein the multiple value sets of the same communication time interval correspond to different subcarrier spacings, wherein each of the multiple value sets comprises multiple values, and wherein the communication time interval comprises at least one of a first time interval from a time the terminal receives downlink scheduling grant information sent by the access network device to a time the terminal receives first downlink data scheduled by using the downlink scheduling grant information, a second time interval from a time the terminal receives second downlink data sent by the access network device to a time the terminal sends hybrid automatic repeat request (HARQ) feedback information of the second downlink data, or a third time interval from a time the terminal receives first uplink scheduling grant information sent by the access network device to a time the terminal sends uplink data scheduled by using the first uplink scheduling grant information; and
   after the access network device sends the first information to the terminal, send second information to the terminal, wherein the second information indicates a value of the communication time interval, wherein the value belongs to the value set, and wherein the value is used by the terminal to determine timing duration of a HARQ round trip time (RTT) timer.

2. The access network device according to claim 1, wherein the programming instructions instruct the access network device further to:
   send third information to the terminal, wherein the third information indicates a processing time of the access network device.

3. The access network device according to claim 1, wherein the programming instructions instruct the access network device further to:
   receive fourth information sent by the terminal, wherein:
   the fourth information comprises a first minimum time interval from a time the terminal receives third downlink data sent by the access network device to a time the terminal sends HARQ feedback information of the third downlink data, the second information indicates a value of the second time interval, and the value of the second time interval is greater than or equal to the first minimum time interval;
   the fourth information comprises a second minimum time interval from a time the terminal receives second uplink scheduling grant information sent by the access network device to a time the terminal sends uplink data scheduled by using the second uplink scheduling grant information, the second information indicates a value of the third time interval, and the value of the third time interval is greater than or equal to the second minimum time interval; or
   the fourth information comprises a first minimum time interval from a time the terminal receives third downlink data sent by the access network device to a time the terminal sends HARQ feedback information of the third downlink data, and a second minimum time interval from a time the terminal receives second uplink scheduling grant information sent by the access network device to a time the terminal sends uplink data scheduled by using the second uplink scheduling grant information, the second information indicates a value of the second time interval and a value of the third time interval, the value of the second time interval is greater than or equal to the first minimum time interval, and the value of the third time interval is greater than or equal to the second minimum time interval.

4. The access network device according to claim 1, wherein the second information indicates an index, in the value set, of the value of the communication time interval.

5. The device according to claim 1, wherein the value set is determined from the multiple value sets based on a transport layer transmission format currently used by the terminal.

6. A communication method, comprising:
   receiving, by a terminal, first information sent by an access network device, wherein the first information comprises a value set from multiple value sets of a communication time interval, wherein the multiple value sets of the same communication time interval correspond to different subcarrier spacings, wherein each of the multiple value sets comprises multiple values, and wherein the communication time interval comprises at least one of a first time interval from a time the terminal receives downlink scheduling grant information sent by the access network device to a time the terminal receives first downlink data scheduled by using the downlink scheduling grant information, a second time interval from a time the terminal receives second downlink data sent by the access network device to a time the terminal sends hybrid automatic repeat request (HARQ) feedback information of the second downlink data, or a third time interval from a time the terminal receives first uplink scheduling grant information sent by the access network device to a time the terminal sends uplink data scheduled by using the first uplink scheduling grant information;

after receiving the first information sent by the access network device, receiving, by the terminal, second information sent by the access network device, wherein the second information indicates a value of the communication time interval, wherein the value belongs to the value set, and wherein the value is used to determine timing duration of a HARQ round trip time (RTT) timer; and determining, by the terminal, the timing duration of the HARQ RTT timer based on the first information and the second information.

7. The communication method according to claim 6, wherein the determining, by the terminal, the timing duration of the HARQ RTT timer based on the first information and the second information comprises:

determining, by the terminal, the timing duration of the HARQ RTT timer based on the first information, the second information, and third information, wherein the third information indicates a processing time of the access network device, and wherein the third information is obtained by the terminal from the access network device or is preconfigured on the terminal.

8. The communication method according to claim 7, wherein the communication time interval comprises the first time interval and the second time interval;

wherein the determining, by the terminal, the timing duration of the HARQ RTT timer based on the first information, the second information, and third information comprises:

determining, by the terminal, a value K0 indicated by the second information in a value set of the first time interval, and determining a value K1 indicated by the second information in a value set of the second time interval; and determining, by the terminal, K1+K0+Δ as timing duration of a downlink HARQ RTT timer, wherein Δ indicates the processing time of the access network device; and wherein the communication method further comprises:

starting, by the terminal, the downlink HARQ RTT timer in a subframe in which the downlink scheduling grant information is received, a transmission time interval in which the downlink scheduling grant information is received, a slot in which the downlink scheduling grant information is received, or a first symbol after the downlink scheduling grant information is received.

9. The communication method according to claim 8, wherein the communication method further comprises:

starting, by the terminal, a retransmission timer in the subframe in which the downlink scheduling grant information is received, in the transmission time interval in which the downlink scheduling grant information is received, at a moment K1+K0+Δ after the slot in which the downlink scheduling grant information is received, or at a moment K1+K0+Δ after the first symbol after the downlink scheduling grant information is received.

10. The communication method according to claim 6, wherein the communication time interval comprises the first time interval and the second time interval;

wherein the determining, by the terminal, the timing duration of the HARQ RTT timer based on the first information and the second information comprises:

determining, by the terminal, a value K0 indicated by the second information in a value set of the first time interval, and determining a value K1 indicated by the second information in a value set of the second time interval; and determining, by the terminal, K1+K0 as timing duration of a downlink HARQ RTT timer; and wherein the communication method further comprises:

starting, by the terminal, the downlink HARQ RTT timer in a subframe in which the downlink scheduling grant information is received, a transmission time interval in which the downlink scheduling grant information is received, a slot in which the downlink scheduling grant information is received, or a first symbol after the downlink scheduling grant information is received.

11. The communication method according to claim 6, wherein the communication time interval comprises the second time interval;

wherein the determining, by the terminal, the timing duration of the HARQ RTT timer based on the first information and the second information comprises:

determining, by the terminal, a value K1 indicated by the second information in a value set of the second time interval; and determining, by the terminal, K1 as timing duration of a downlink HARQ RTT timer; and wherein the communication method further comprises:

starting, by the terminal, the downlink HARQ RTT timer in a subframe in which the second downlink data is received, a transmission time interval in which the second downlink data is received, a slot in which the second downlink data is received, or a first symbol after the second downlink data is received.

12. The communication method according to claim 6, wherein the communication time interval comprises the third time interval;

wherein the determining, by the terminal, the timing duration of the HARQ RTT timer based on the first information and the second information comprises:

determining, by the terminal, a value K2 indicated by the second information in a value set of the third time interval; and determining, by the terminal, K2 as timing duration of an uplink HARQ RTT timer; and wherein the communication method further comprises:

starting, by the terminal, the uplink HARQ RTT timer in a subframe in which the first uplink scheduling grant information is received, a transmission time interval in which the first uplink scheduling grant information is received, a slot in which the first uplink scheduling grant information is received, or a first symbol after the first uplink scheduling grant information is received.

13. A communication device, comprising:

at least one processor; and a non-transitory computer-readable storage medium coupled to the at least one processor and storing programming instructions for execution by the at least one processor, wherein the programming instructions instruct the device to:

receive first information sent by an access network device, wherein the first information comprises a value set from multiple value sets of a communication time interval, wherein the multiple value sets of the same communication time interval correspond to different subcarrier spacings, wherein each of the multiple value sets comprises multiple values, and wherein the communication time interval comprises at least one of a first time interval from a time the device receives downlink scheduling grant information sent by the access network device to a time the device receives first downlink data scheduled by using the downlink scheduling grant information, a second time interval from a time the device receives second downlink data sent by the access network device to a time the device sends hybrid automatic repeat request (HARQ) feedback information of the second downlink data, or a third time interval from a time the device receives first uplink scheduling grant information sent by the access network device to a time the device sends uplink data scheduled by using the first uplink scheduling grant information;

after receiving the first information sent by the access network device, receive second information sent by the access network device, wherein the second information indicates a value of the communication time interval, wherein the value belongs to the value set, and wherein the value is used to determine timing duration of a HARQ round trip time (RTT) timer; and determine the timing duration of the HARQ RTT timer based on the first information and the second information.

14. The device according to claim 13, wherein the programming instructions instruct the device to:

determine the timing duration of the HARQ RTT timer based on the first information, the second information, and third information, wherein the third information indicates a processing time of the access network device, and wherein the third information is obtained by the device from the access network device or is preconfigured on the device.

15. The device according to claim 14, wherein the communication time interval comprises the first time interval and the second time interval, and the programming instructions instruct the device to:

determine a value K0 indicated by the second information in a value set of the first time interval, and determine a value K1 indicated by the second information in a value set of the second time interval;

determine K1+K0+Δ as timing duration of a downlink HARQ RTT timer, wherein Δ indicates the processing time of the access network device; and start the downlink HARQ RTT timer in a subframe in which the downlink scheduling grant information is received, a transmission time interval in which the downlink scheduling grant information is received, a slot in which the downlink scheduling grant information is received, or a first symbol after the downlink scheduling grant information is received.

16. The device according to claim 15, wherein the programming instructions instruct the device further to:

start a retransmission timer in the subframe in which the downlink scheduling grant information is received, in the transmission time interval in which the downlink scheduling grant information is received, at a moment K1+K0+Δ after the slot in which the downlink scheduling grant information is received, or at a moment K1+K0+Δ after the first symbol after the downlink scheduling grant information is received.

17. The device according to claim 13, wherein the communication time interval comprises the first time interval and the second time interval, and the programming instructions instruct the device to:

determine a value K0 indicated by the second information in a value set of the first time interval, and determine a value K1 indicated by the second information in a value set of the second time interval;

determine K1+K0 as timing duration of a downlink HARQ RTT timer; and start the downlink HARQ RTT timer in a subframe in which the downlink scheduling grant information is received, a transmission time interval in which the downlink scheduling grant information is received, a slot in which the downlink scheduling grant information is received, or a first symbol after the downlink scheduling grant information is received.

18. The device according to claim 13, wherein the communication time interval comprises the second time interval, and the programming instructions instruct the device to:

determine a value K1 indicated by the second information in a value set of the second time interval;

determine K1 as timing duration of a downlink HARQ RTT timer; and start the downlink HARQ RTT timer in a subframe in which the second downlink data is received, a transmission time interval in which the second downlink data is received, a slot in which the second downlink data is received, or a first symbol after the second downlink data is received.

19. The device according to claim 13, wherein the communication time interval comprises the third time interval, and the programming instructions instruct the device to:

determine a value K2 indicated by the second information in a value set of the third time interval;

determine K2 as timing duration of an uplink HARQ RTT timer; and start the uplink HARQ RTT timer in a subframe in which the first uplink scheduling grant information is received, a transmission time interval in which the first uplink scheduling grant information is received, a slot in which the first uplink scheduling grant information is received, or a first symbol after the first uplink scheduling grant information is received.

20. The device according to claim 13, wherein the programming instructions instruct the device further to:

send fourth information to the access network device, wherein:

the fourth information comprises a first minimum time interval from a time the device receives third downlink data sent by the access network device to a time the device sends HARQ feedback information of the third downlink data, the second information indicates a value of the second time interval, and the value of the second time interval is greater than or equal to the first minimum time interval;

the fourth information comprises a second minimum time interval from a time the device receives second uplink scheduling grant information sent by the access network device to a time the device sends uplink data scheduled by using the second uplink scheduling grant information, the second information indicates a value of the third time interval, and the value of the third time interval is greater than or equal to the second minimum time interval; or the fourth information comprises a first minimum time interval from a time the device receives third downlink data sent by the access network device to a time the device sends HARQ feedback information of the third downlink data, and a second minimum time interval from a time the device receives second uplink scheduling grant information sent by the access network device to a time the device sends uplink data scheduled by using the second uplink scheduling grant information, the second information indicates a value of the second time interval and a value of the third time interval, the value of the second time interval is greater than or equal to the first minimum time interval, and the value of the third time interval is greater than or equal to the second minimum time interval.

* * * * *